US008942866B2

(12) United States Patent
Shue et al.

(10) Patent No.: US 8,942,866 B2
(45) Date of Patent: Jan. 27, 2015

(54) EXTENSION OF THREE LOOP CONTROL LAWS FOR SYSTEM UNCERTAINTIES, CALCULATION TIME DELAY AND COMMAND QUICKNESS

(71) Applicant: Bell Helicopter Textron Inc., Fort Worth, TX (US)

(72) Inventors: Shyhpyng Jack Shue, Grapevine, TX (US); John J. Schillings, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 13/926,072

(22) Filed: Jun. 25, 2013

(65) Prior Publication Data

US 2013/0274963 A1 Oct. 17, 2013

Related U.S. Application Data

(63) Continuation-in-part of application No. 11/665,138, filed as application No. PCT/US2005/040394 on Nov. 8, 2005, now Pat. No. 8,473,124.

(60) Provisional application No. 60/625,848, filed on Nov. 8, 2004.

(51) Int. Cl.
*G06F 19/00* (2011.01)
*G01C 22/00* (2006.01)

(52) U.S. Cl.
USPC ........ 701/4; 701/12; 700/29; 700/44; 700/90; 244/158 R

(58) Field of Classification Search
USPC ................. 701/4, 12, 24, 11; 700/29, 44, 90; 395/22, 21; 318/560; 344/158 R
See application file for complete search history.

(56) References Cited

U.S. PATENT DOCUMENTS

| 5,796,922 | A | * | 8/1998 | Smith ............................. 706/23 |
| 6,089,507 | A | * | 7/2000 | Parvez et al. .............. 244/158.8 |
| 6,539,290 | B1 | * | 3/2003 | Vos ................................... 701/3 |
| 6,729,139 | B2 | | 5/2004 | Desai et al. |
| 7,277,764 | B2 | * | 10/2007 | Hovakimyan et al. .......... 700/28 |
| 7,873,445 | B2 | | 1/2011 | Schaeffer |

(Continued)

OTHER PUBLICATIONS

Office Action dated Sep. 3, 2010 from counterpart U.S. Appl. No. 11/665,138.

(Continued)

*Primary Examiner* — Ronnie Mancho
(74) *Attorney, Agent, or Firm* — James E. Walton; Richard G. Eldredge

(57) ABSTRACT

A system includes a plurality of actuators and a control system operably associated with the plurality of actuators. The control system having a control logic architecture having a dynamic command input shaping model associated with an input command, a robust inner loop associated with the dynamic command input shaping model, and a time delay cancellation model. The method includes selecting a control law based upon a flight performance of an aircraft, decoupling the control law into a first individual component and a second individual component of the aircraft flight motion, analyzing each individual component separately, regrouping the component of flight motion, analyzing the control law with a time delay cancellation model and providing the necessary dynamic flight quickness with a different command input condition.

19 Claims, 17 Drawing Sheets

(56) References Cited

U.S. PATENT DOCUMENTS

2003/0094001 A1* 5/2003 Desai et al. .................. 60/791
2005/0004723 A1* 1/2005 Duggan et al. ................ 701/24

OTHER PUBLICATIONS

Amendment dated Sep. 20, 2010 from counterpart U.S. Appl. No. 11/665,138.
Final Office Action dated Dec. 8, 2010 from counterpart U.S. Appl. No. 11/665,138.
Interview Summary dated Jan. 19, 2011 from counterpart U.S. Appl. No. 11/665,138.
Amendment After Final dated Feb. 8, 2011 from counterpart U.S. Appl. No. 11/665,138.
Advisory Action dated Feb. 17, 2011 from counterpart U.S. Appl. No. 11/665,138.
Office Action dated Mar. 30, 2011 from counterpart U.S. Appl. No. 11/665,138.
Interview Summary dated Jul. 14, 2011 from counterpart U.S. Appl. No. 11/665,138.
Amendment dated Jul. 29, 2011 from counterpart U.S. Appl. No. 11/665,138.
Final Office Action dated Nov. 17, 2011 from counterpart U.S. Appl. No. 11/665,138.
Amendment After Final dated Jan. 12, 2012 from counterpart U.S. Appl. No. 11/665,138.
Advisory Action dated Jan. 20, 2012 from counterpart U.S. Appl. No. 11/665,138.
Notice of Allowance dated Nov. 8, 2012 from counterpart U.S. Appl. No. 11/665,138.
Chinese Office Action dated May 27, 2009 from counterpart CN App. No. 2005800377971.
Chinese Decision to Grant dated Oct. 16, 2009 from counterpart CN App. No. 2005800377971.
Canadian Office Action dated Oct. 22, 2010 from counterpart CA App. No. 2,585,105.
European Search Report dated Feb. 6, 2008 from counterpart EP App. No. 05858477.2.
European Search Report dated Mar. 18, 2011 from counterpart EP App. No. 05858477.2.
European Search Report dated Sep. 22, 2011 from counterpart EP App. No. 05858477.2
European Amendment dated Dec. 29, 2011 from counterpart EP App. No. 05858477.2.
European Amendment dated Jul. 14, 2011 from counterpart EP App. No. 05858477.2.
European Amendment dated Jul. 30, 2009 from counterpart EP App. No. 05858477.2.
Canadian Amendment dated Apr. 14, 2011 from counterpart CA App. No. 2,585,105.
Canadian Office Action dated Jul. 18, 2013 from counterpart CA App. No. 2,585,105.

* cited by examiner

EXTENSION OF THREE LOOP CONTROL LAWS FOR SYSTEM UNCERTAINTIES, CALCULATION TIME DELAY AND COMMAND QUICKNESS

BACKGROUND

1. Field of the Invention

The present application is directed to flight control law architectures.

2. Description of Related Art

Control of aircraft consists of (1) feedback gain design and arrangement, and (2) Logic design of how to switch from one loop to another loop. Method of three loop control laws has provided a fundamental method to change the traditional method (inner loop and outer loop only) for aircraft control gain design to three loop control laws design. The three loop control laws hereby will be extended into the other stage of making all gain sets to be available from vertical takeoff and landing (VTOL) to airplane or from airplane to VTOL flight modes. In addition, the associated logic design using state machines will be collaborated so that the entire flight control computer (FCC) vehicle management system (VMS) architecture will be powerful for manned, unmanned, and optional manned types of flights.

To make the feedback control of an uncertainty system to be robust, stability and control are one of the most important factors. However, these factors will be affected by the control plant model, control sensor measurement feedback, system dead-time delay also known as transport time delay and control command quickness. Several methods have been discussed heavily in the recent years. The first one is the standard model following technology. Model following is indeed one of very powerful methods to improve the control system with better gain margin, phase margin and disturbance rejection. However, the improvement of this method is needed, since it may slow down the pilot's command during the emergency flight characteristics.

The second factor is the dead-time delay on the feedback control computer and sensor feedback measurement. In fact, the entire calculation time-delay in the rotorcraft industries can be resources from the sensor measurement, aerodynamics delay, actuator delay and control input delay from aircraft mechanical link or fly-by-wire (FBW) command. If the sum of the total calculation time delay is too large, the aircraft will become uncontrollable or very hard to control. Therefore, the design of the aircraft plant plays a very important role. Traditionally, the aircraft flight mechanics design must satisfy certain stability requirements such that the aircraft can be handled with and without feedback control laws. Therefore, when aircraft goes into the final degrade mode, the natural flight mechanics mode is used for the pilot command control.

The third method is to apply the inverse plant to help stabilize the aircraft. This method is also very powerful for traditional aircraft control, when the aerodynamics coefficients speed-schedule curves are approximately linear. However, this method may have a problem when the major aerodynamics coefficients cross-over the zero imaginary axis line for new advanced aircraft design. Nowadays, design of the aircraft have moved to multi-operable such as manned, optionally manned and unmanned aircraft, which requires the flight control system to be fly-by-wire type. This type of aircraft can be designed to save the entire gross weight for a more unstable flight mechanics mode. The advantages of this type of aircraft are: (1) Much higher lift coefficient; (2) Shorter take-off range; (3) Shorter control surfaces; (4) Entire aircraft weight saving; and, (5) Smaller engine powers to decrease fuel consumptions.

In addition, for this type of aircraft, the final degrade mode for flight control is not necessary to be the natural flight mechanics mode, because of optional manned and unmanned functions. Depending on availability of sensor redundancy design, the final flight control design mode for this type of aircraft can be either rate command or attitude command/attitude hold or speed hold. Since this type of aircraft will not have the direct link in the aircraft for pilot's maneuver, the command quickness for the manned and unmanned can become challenging tasks for the design engineers.

Recently, new aircraft have been designed with much more unstable flight mechanics modes by taking the above listed benefits. Because of this unstable factor, there may be some major coefficients which cross-over the imaginary axis from stable modes to unstable modes, due to airspeed or C.G. changes. For such a situation, the use of the inverse plant of aircraft model must be designed to avoid dividing by zeroes. Design criteria of aircraft have now moved from a traditional classic feedback method, to a much more challenging stage.

Although the foregoing developments represent great strides in the area of control law systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
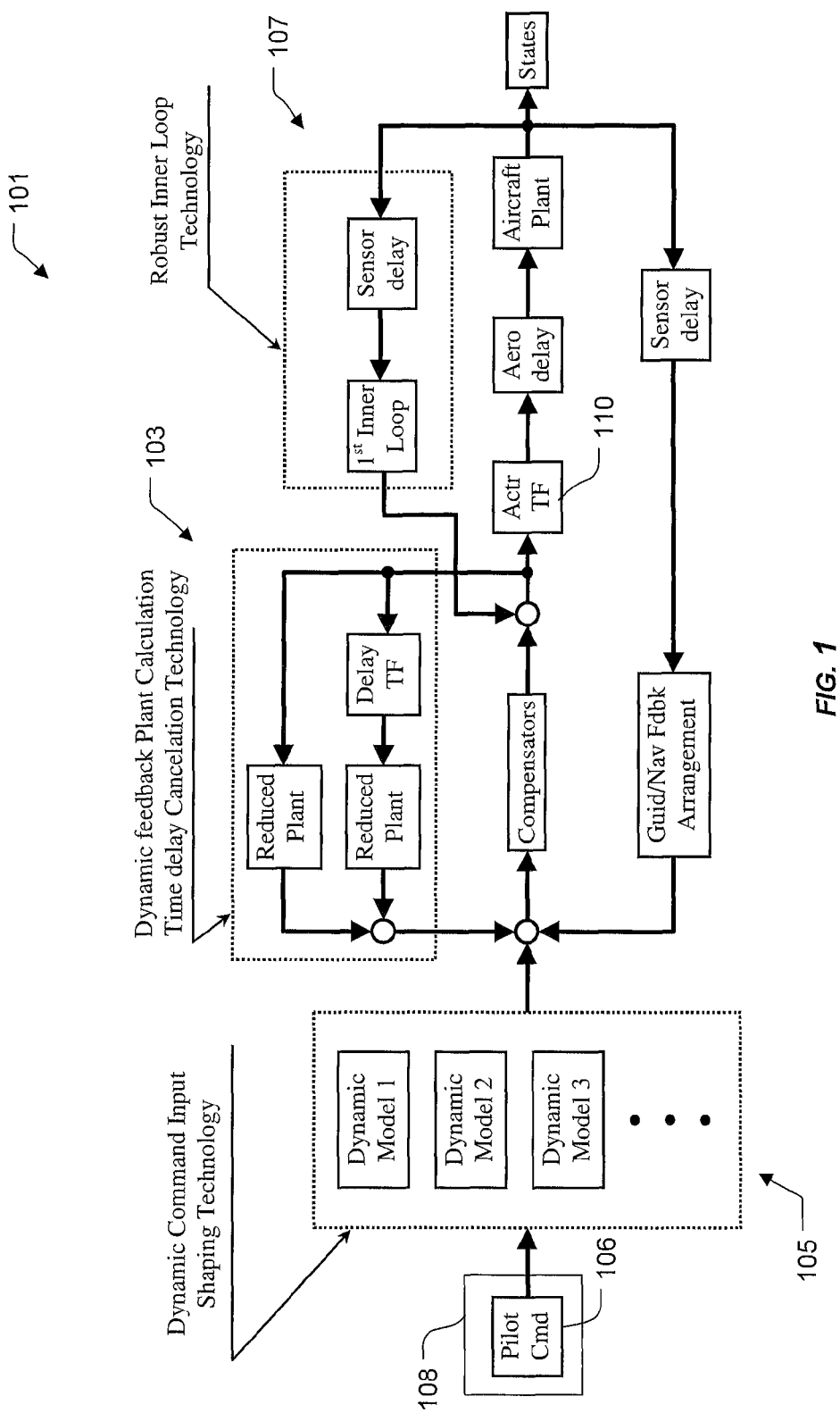
FIG. 1 shows advanced feedback control laws diagram for system coefficient uncertainties, dead-time delay and command quickness.

While the system and method of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of the system and method are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of the present application will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

It will be appreciated that the three loop control laws design discussed below is configured to control one or more of: (1) system plant uncertainties; (2) transport time delay in feedback control; and, (3) improved pilot command quickness with or without a transport time delay feedback control system.

To achieve these goals, the robust $1^{st}$ inner loop design based on various airspeed scheduling linear models are utilized in the preferred embodiment. The key objective is to find a composite Riccati solution matrix that satisfies nine Riccati inequalities. In the contemplated embodiments, there exist three processes to obtain the composite Riccati solution. The first step is to obtain the reduced-order Riccati solutions from the reduced order Riccati inequalities. The second step is to integrate these reduced-order Riccati solutions to a composite Riccati solution. The third step is to evaluate the composite Riccati solution integrated with the full linear plants to re-check the control gain margin, phase margin and disturbance rejection. If the system satisfies all requirements, the design will move to gain schedule methods. Otherwise, the process will repeat to find which axis or reduced-order plant is not within the desired requirement. From comparison of the reduced model and full model after robust $1^{st}$ inner design, one can identify/verify which control axis is affected by the uncertainties the most. Then, the robust feedback control can be tuned on this axis to force the system to come out with the optimal-robust-satisfied solution.

Since the entire robust calculation is evaluated from the reduced models to the full models, the uncertainties between the reduced order and full order integration are all satisfied if the desired Riccati solution is obtained. After the reduced order process was achieved, the speed scheduling methods based on various airspeeds are introduced. Two speed scheduling technologies are introduced. The first method is based on the full order of the aircraft linear models using robust $1^{st}$ inner loop technology. The second method is based on separation of longitudinal and lateral motions. The reasons of using these two processes are to generate the algorithm to reach one fixed gain set through these gain schedule methods. Therefore, the speed gain scheduling feedback gain on the $1^{st}$ inner loop can be avoided. This means that the entire control laws will use one robust feedback gain set for the entire control laws design for maneuvering and hold modes.

It has been shown that the robust $1^{st}$ inner loop design has saved a lot of time in advanced feedback control laws design. However, it is also found that the plant transport time delay also plays a very important role to damage the aircraft stability and control. To overcome these negative effects from transport time delay, also called dead-time, the dynamic plant feedback technology including time delay is introduced, instead of the inverse plant method. Note that it is intended to avoid the inverse plant method, since the inverse plant method may result in an infinity feedback gain if the major aerodynamic coefficients on the plant have the values, which crossover the imaginary axis or change their signs from positive to negative or from negative to positive.

Two methods of dynamic plant feedback technology including transport time delay are introduced in this application. The first method is to use the normalized reduced order of the aircraft as the feedback pant with transfer function of the transport time delay to cancel out the negative effect of the calculation time delay from aerodynamics, actuators and/or measurement devices. This method is focus on time delay cancellation on individual sensor loop. Before discussion of the dynamic plant feedback technology including time delay, the normalized reduced-order linear plants for individual axis control are developed first. Instead of using the linear models with respect to various airspeeds, the normalized reduced linear models are generated. The benefits of using this method are to: (1) avoid too many plant feedback models in the control laws design; (2) avoid speed gain schedule methods for feedback plants; (3) avoid the integrator design inside the control laws; (4) quickly determine the individual feedback plants for the dynamic plant feedback control technology; and (5) the desired method will work even with aerodynamics coefficients crossing over the imaginary axis.

Since all delay times are sufficiently small, the transfer function of transport time delay has shown that its unstable zero is real and very close to the origin of complex plane. Therefore, it is known that the flight mechanics eigenvalues with slow frequency or the unstable poles will be affected by the transport time delay the most. Therefore, the dynamic feedback plant can be switched from the full model to the reduced-order plant without the fast modes of the flight mechanics.

The first method of dynamic plant feedback technology including transport time delay focuses on feedback of the individual reduced-order plant for its associated transport time delay. This method assumes that the transport time delay from each measurement sensor device is different. Therefore, the individual reduced-order plant feeds back with its associated time delay. In the contemplated embodiment, the entire feedback control laws are integrated through from the fast mode to the hold mode for autopilot flight.

The second method of dynamic plant feedback technology including transport time delay is to assume that the total transport time delay is a fixed value. Feedback control laws based on the total time delay are used for cancellation of the effect from transport time delay. Since the transfer function of the transport time delay is so small, only the slow poles of flight mechanics will be affected the most. Therefore, spiral mode and Dutch roll mode of the dynamics plant of the flight mechanics is taken into consideration for lateral motion control. Similarly, the Phugoid mode transfer function of the full plant in longitudinal motion will be taken into consideration for the reduced order feedback plant. Both feedback normalized reduced-order plants with its associated transport time delay transfer function have been examined and tested successfully.

It should be understood that a pure standard model following method will not work very well in emergency flight conditions, such as autorotation. It is also shown that in the actuator failure mode, the standard model following method is too quick (overload) for the actuator load. To overcome the above situations, the dynamic command input shaping technology is utilized. Instead of using a standard model following method, the quickness of the pilot command input is introduced based on its total travel position, command rate and command acceleration. Therefore, the dynamic model transfer functions for command input shaping technology are introduced. When the pilot is in the normal flight maneuver under a certain threshold in the rate and acceleration of the stick command, the aircraft can fly the standard model following method with very good performance. However, when the rate and/or acceleration is over a certain threshold, the aircraft logic from dynamic control input shaping technology immediately switches the aircraft command to a quicker dynamic model transfer function such that the aircraft will respond quicker. With this arrangement, the quickness of the aircraft will follow the pilot command. The dynamic model from command input shaping technology will not be a barrier of the flight control laws to slow down the aircraft when a significant and rapid pilot input is applied to the flight control. Similarly, the desired method also takes the sensor failure, actuator failure, and/or flight control computer failure mode for control laws final degrade mode. In the final degrade mode, the slower dynamic model transfer functions are used to increase the aircraft gain margin, phase margin and disturbance rejection, by reducing the control stick command bandwidth. Since the quickness of the command in final degrade mode must be avoided, instead of using the standard model following transfer function and leave the slow command motion by the pilot, the dynamic command input shaping technology introduces the slower dynamic model which will increase the aircraft gain margin, phase margin and disturbance rejection requirement. Therefore, with and without the pilot slowing down the stick command, the desired method will enhance the final degrade mode for the aircraft flight control laws.

A helicopter having dual engine failure is used as an example to demonstrate how powerful the desired three loop control laws is. Note that this motion is also known as autorotation control. The simulation of autorotation entrance is used to express the differences between the standard model following transfer function and the dynamic control input shaping technology. It is assumed that the standard model following method also contains cancellation of transport time delay effects. The result of the dynamic command input shaping technology shows that the rate of descent within one second can reach more than 40 ft/sec. For the standard model following method, it will take approximate four seconds to reach the same condition as the dynamic command input shaping technology. Of course, the dynamic command input shaping technology will make the engine RPM back to 100% much faster than that of the standard model following method. In fact, the desired method may allow the aircraft to fly out of dead-man zone of H-V curve.

As shown in FIG. 1, a control system of a vehicle utilizes a three loop control laws design architecture 101 having: (1) a dynamic plant feedback technology including transport time delay 103, (2) the dynamic command input shaping technology 105, and (3) a robust 1st inner loop design 107. In the contemplated embodiment, architecture 101 is operably associated with a vehicle such as an aircraft. However, alternative embodiments are also contemplated.

The robust 1st inner loop design 107 is consolidated such that the system uncertainties inside the plant model can be reduced. As depicted, a pilot command 106 from an interface 108 is received by the dynamic command input shaping technology, which is analyzed with both the robust 1st inner loop design 107 and the time delay design 105. In the preferred embodiment, the command 106 is from manually received from the pilot; however, alternative embodiments could utilize autonomous commands. The detail designs of feedback control of an uncertain system for calculation time delay using three loop control laws contains three portions. The first portion will be the robust 1st inner loop design 107. The second method is the dynamic plant feedback technology including transport time delay 103. The third method is the dynamic command input shaping technology 105. All these three methods are discussed below.

Robust $1^{st}$ Inner Loop Technology

To eliminate the effect due to system uncertainties using a LQR or H2/Hinf method, knowledge of full order to reduced order plays a very important role. For example, when the reduced-order plant can be controlled and after integrating these reduced-order feedback gain sets into the full order system, the full order feedback control fails to show much improvement. This information indicates that the coupling terms from off-diagonal matrix terms in the plant are not tuned correctly. Usually, these off-diagonal terms in the state matrix or the control matrix of the linear control system will be affected mostly by the system uncertainties. These coupling effects can be from longitudinal to lateral motion or from lateral to longitudinal motion. It can also be on all four axial coupling together. Depending on the design, actuator 110 arrangement can be used to decouple the inter-axial effect up to a minimum stage. However, for the VTOL aircraft, this couple will never die-down. For example, the anti-torque effect from main rotor torque to tail rotor control will exist by nature for the helicopter design.

To achieve the inter-axial decoupling or minimize the inter-axial coupling, the method of eliminating the off-diagonal matrix effect in the individual linear model has been studied. In the extension of decoupling technology using three loop control laws architecture design, the method of decoupling the inter-axial effect through the robust $1^{st}$ inner loop technology is presented using reduced models. Later, this method will be integrator with reduced-order plant feedback control including transport time delay to achieve the decoupling flight for VTOL aircraft.

Method of Decoupling Using Three Loop Control Laws

Model reduction technology is applied to reach robustness of the 1st inner loop inherited from the three loop control laws design. These features of the model reduction are shown in the accompanying FIGS. 2, 3 and 4.

It will be appreciated that one unique feature believed characteristic of the present application is utilizing the below described process of separating the flight mechanism to individual flight directional motions, then applying analysis to each separated control law prior to regrouping. It should be understood that attempting to analyze each control law without first decoupling is time consuming, resulting in a slower response period. Further detailed description of the preferred embodiment is provided below.

Figure 2:
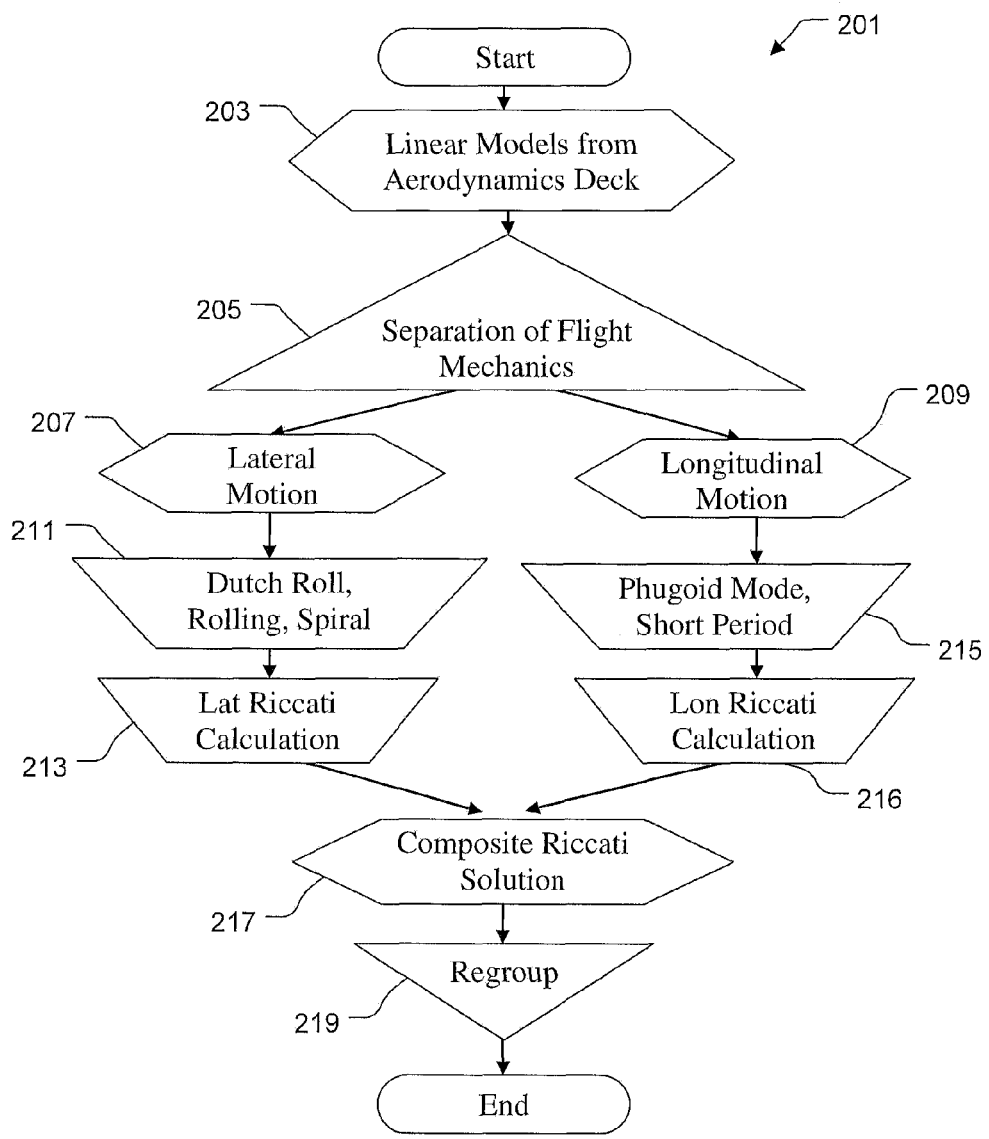
FIG. 2 shows the first inner loop process for model reductions.

FIG. 2 is an exemplary flowchart 201 that depicts the preferred process to calculate the Riccati solution from the longitudinal and lateral 4×4 linear flight models. The sequence process and computation methods to expand the stability region are represented by a flow chart 201. Block 203 represents the linear models derived from aerodynamics analysis and/or wind tunnel data. Block 205 represents the separation of flight mechanics, for example, separation of the control laws into a lateral control law motion 207 and a longitudinal control law motion 209. It will be appreciated that decoupling the control laws in components, e.g., lateral and longitudinal motions, allows rapid calculation in the single degree of motion. After the decoupling of the control laws into flow paths for longitudinal and lateral components, the lateral motion information passes through dutch roll, rolling, and spiral, represented as block 211. The lateral motion architecture includes calculating the motion via Riccati calculations, as represented as block 213. For the longitudinal motion, the longitudinal information passes through phugoid mode and short period, as represented as block 215 and thereafter is calculated with the longitudinal Riccati calculation, as represented in block 216. Thereafter, the longitudinal motion and the lateral motion is calculated with a composite Riccati solution and thereafter regrouped, as represented in respective blocks 217 and 219.

Figure 3:
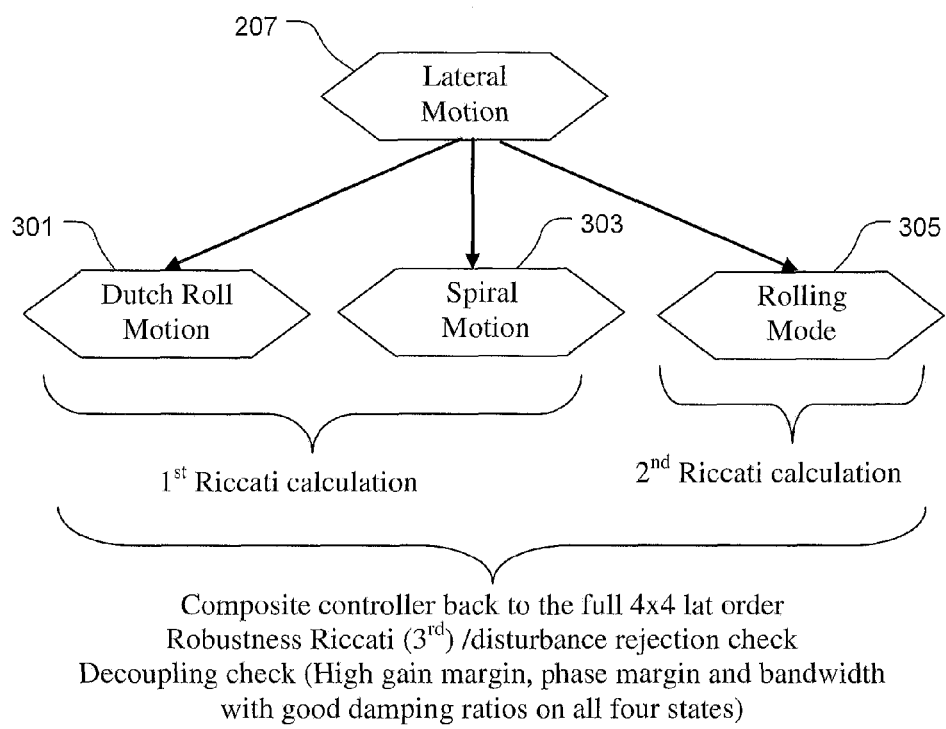
FIG. 3 shows the first inner loop process for lateral Riccati solutions.

FIG. 3 is taken in part from FIG. 2, and shows the lateral model 207 reduced into 3×3 and 1×1 matrices for two subsequent Riccati solutions. As illustrated, a first Riccati calculation is utilized with Dutch Roll motion 301 and Spiral motion 303, while a second Riccati calculation is utilized with the Rolling mode 305.

Figure 4:
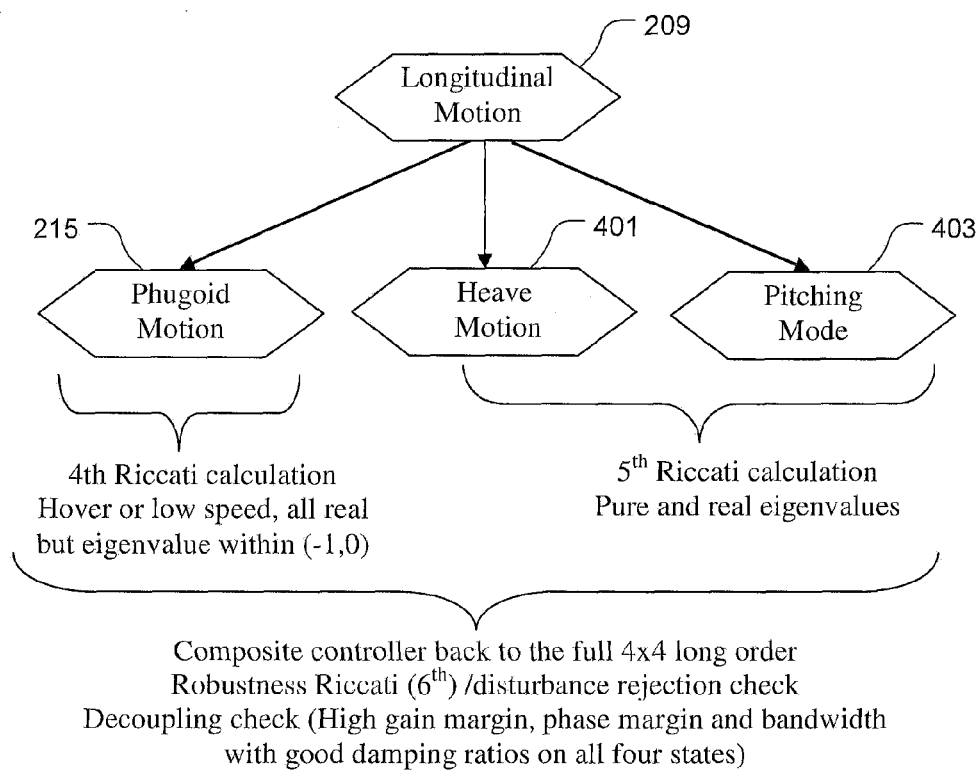
FIG. 4 shows the first inner loop process for longitudinal Riccati solutions.

Longitudinal model reduction with Riccati solutions are shown in FIG. 4. As depicted, the low speed longitudinal motion 209 is employed to show the model reduction calculation. It should be noted that in the low speed longitudinal mode, the eigenvalue can be split into two real values for heave motion 401 and pitching modes 403 from the short period maneuver. To decouple the system similar to the open loop system, it is preferred to maintain the heave mode to be in a heave mode state and short period to be complex conjugate for low speed and high speed using the three loop control laws design. Therefore the longitudinal motion can use model reduction technology to be two 2×2 matrices for Riccati calculations.

Methods of Speed Gain Scheduling

Two gain scheduling methods are preferably utilized in the present application to determine whether a fixed global gain is possible such that the entire aircraft can be stabilized with reasonable actuator responses for all airspeeds. After the above model reduction with robust control inner loop design, some aircraft maneuvers can be controlled by the individual axis. For example, in low speed, the heave mode will be the real eigenvalue. Therefore, it will be pure first order response. Similarly, the Phugoid mode at high airspeed will remain approximately one radian per second away from the short period mode. Therefore, the pure rate response will perform very well for the rate command mode. For pitch attitude hold or the speed hold modes, since the trim follow-up technology is applied, the speed sensor failure mode auto converted to attitude hold will be easy and without transient. For the pedal loop in the low speed, the pure flat turn can be generated so that the heading hold can be easily controlled by the pedal loops. Similarly, the lateral reposition can be easily controlled by the lateral controller with heading hold within ±1 to 2° during maneuvering. At a high speed, the pedal loop control will be switched to turn coordination to help the lateral maneuver, or pure sideslip control if the pure pedal input is applied. For the heading hold in the high speed, the lateral heading hold will be much easier than that of the pedal heading hold. All these functions will be very standard control after decoupling the individual loop control.

The gain scheduling based on airspeed can then be applied to the flight control laws. To make the first inner loop from the robust calculation as close to each other as possible to avoid speed failure gain schedule issue, the uncertainty technology is applied. There are preferably two methods utilized in the present application. The first gain scheduling method, depicted as diagrams 501 and 601, are shown in respective FIGS. 5 and 6. In these two figures, the lateral and longitudinal are integrated together for the entire re-grouping process. Thereafter, the stability margin and bandwidth are calculated. It should be understood that the uncertainties of the system during this process can be assumed to be from: 1. the speed difference; 2. the center of gravity (CG) difference; and 3. the altitude difference. Other factors are also contemplated, but not listed.

Figure 5:
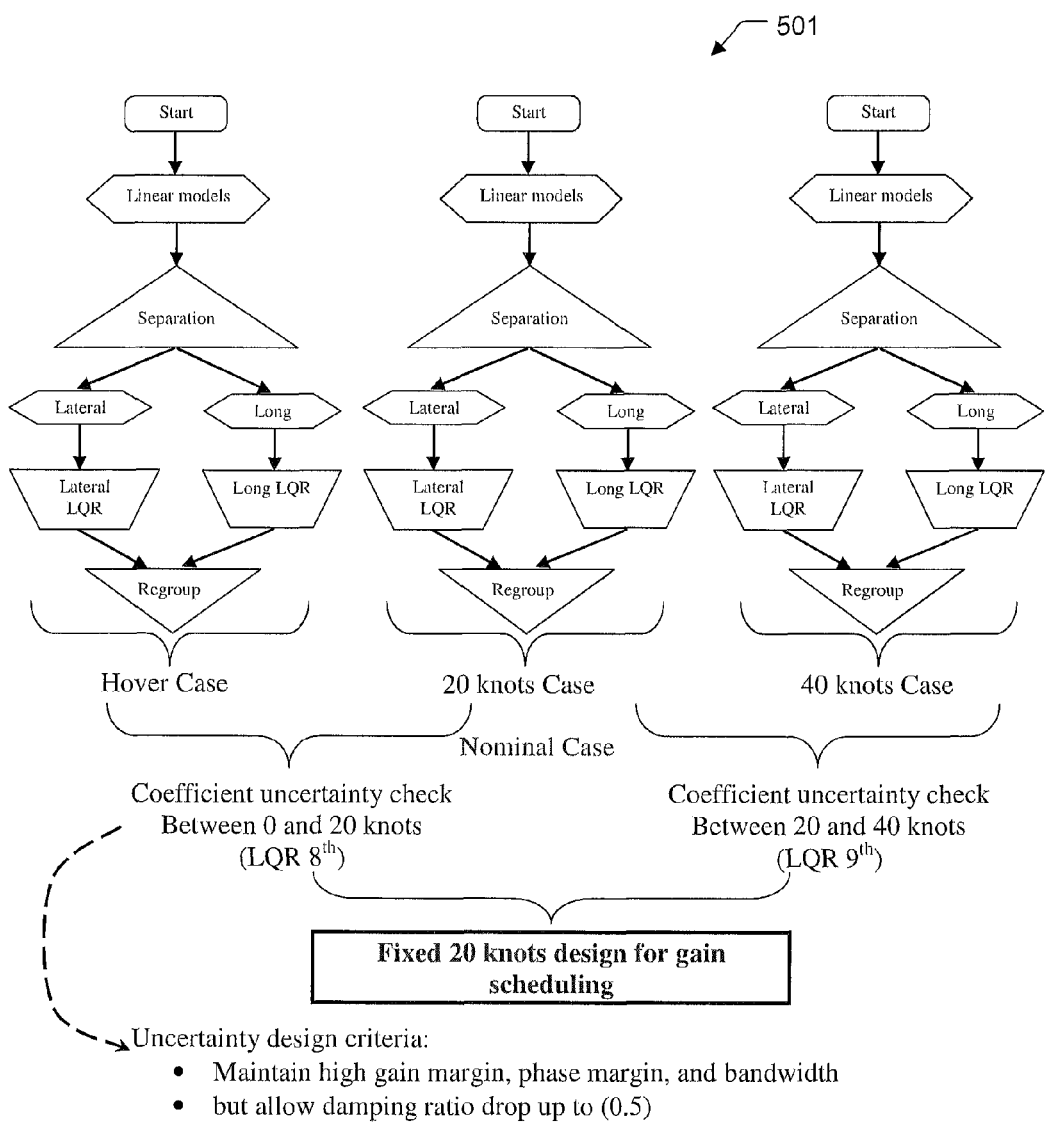
FIG. 5 shows the integration of lateral and longitudinal with gain scheduling for 20 knots.
Figure 6:
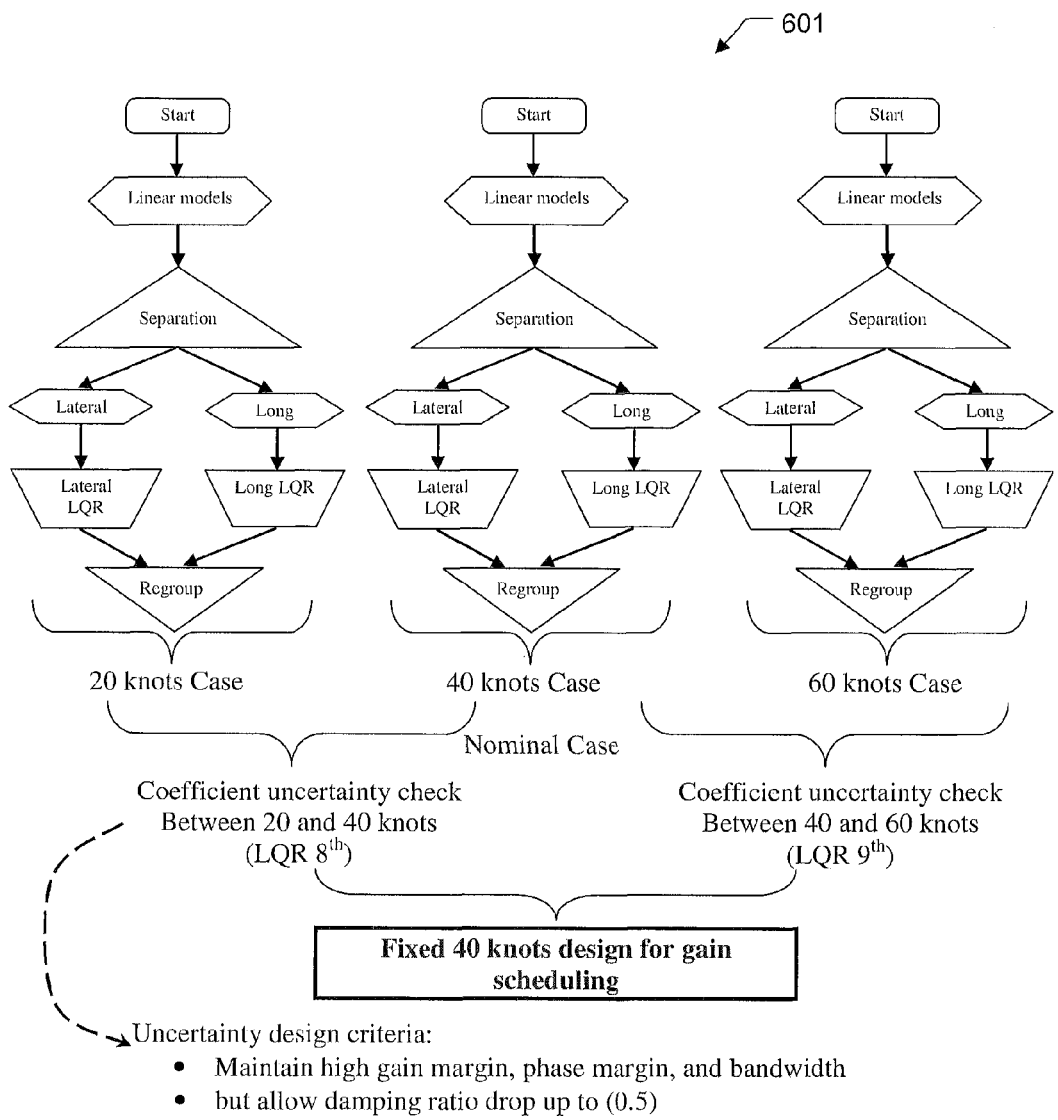
FIG. 6 shows the integration of lateral and longitudinal with gain scheduling for 40 knots.

In FIGS. 5 and 6, the airspeed, for example, hover, 20, 40, and 60 knots, is used as an example of how to compute the uncertainties. In the preferred process, the airspeed is first selected as an uncertainty, then the CG, and finally the altitude density. With robust calculations from the three loop method, the entire uncertainties can be easily determined and the individual inner loop determination can then be obtained.

In both FIGS. 5 and 6, the processes of stabilizing the linear models are utilized during the hovering mode and during various speed scenarios. After the full aircraft linear model is decoupled into lateral and longitudinal components of motion, the effect of coupling terms between lateral and longitudinal motions can be reduced to minimum, while applying an improved linear quadratic regulator (LQR) to stabilize the system. Thereafter, the lateral and longitudinal motions are regrouped and the process of gain scheduling is utilized. This process is illustrated in the diagrams for each airspeed.

Figure 7:
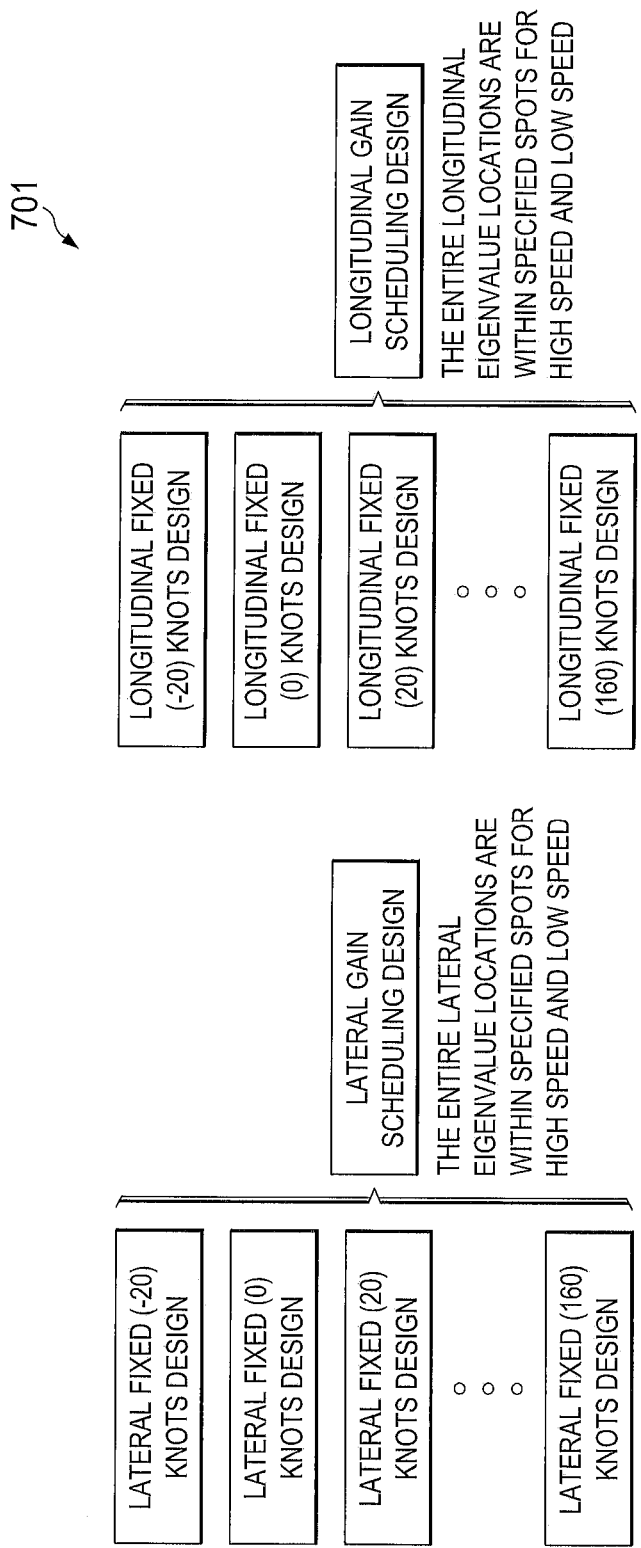
FIG. 7 shows the individual lateral and longitudinal gain scheduling method.

The second gain schedule process is shown as diagram 701 in FIG. 7. The lateral and longitudinal gain schedule is independent of the full linear model during gain scheduling design. Later, all gain sets will be checked with respect to the full linear models.

It should be noted that the best design is to set the gain schedule value within 10% difference such that the airspeed sensor failure mode can be designed to one gain set only. The above two methods with robust gain schedule design will help the control laws design resulting in one main gain set such that all linear models after constant gain set feedback are all within certain tolerance of gain margin, phase margin and disturbance rejection requirements. All others gain scheduling sets will then become minor adjustments from this main set. Therefore, when airspeed scheduling method cannot be used due to airspeed sensor failures or faults, the main gain set can still be used for the degraded mode. The entire control laws design will only lose a little of stability and control requirements.

Dynamic Plant Feedback Technology Including Time Delay

Dynamic plant feedback technology is used to cancel out the plant transport delay. Effects of plant transport delay in three loop flight control laws design can be reduced to be minimized using two methods. The first method is to introduce the transport delay into individual control loop, when multiple sensor transport delays are detected through the flight test. The second method is to assume the transport delay on individual control loop is with the same transport time delay. Therefore, one major sensor transport delay on each axis of control laws are fed-back with its associated reduced-order plant transfer function. These two methods are described below.

The VTOL model to describe the flight dynamics of an aircraft is with several first order transport delays at: (1) Sensor feedback; (2) Aerodynamics delay; (3) FCC Calculation time-delay; and (4) Actuator delay.

A transport time delay or dead times (DTs) between inputs and outputs is very common in an aircraft flight control process loop. Transport and measurement lags, computation and communication lags all introduce as transport time delays or dead times (DTs) into control loops. DTs are also used to compensate for model reduction where higher order systems are represented by the lower order models with delays. Two major consequences from transport delays: (1) Complicates the analysis and design feedback control system; and, (2) Make satisfactory control more difficult to achieve.

Any delay in measuring, in controller action, in actuator operation, in computer computation and the like, is called transport delay of dead time. It always reduces the stability of a system and limits the achievable response time of the system. Therefore, the representation of the output state differences between measurement output and output before measurement can be shown below:

$$\frac{Y_o}{Y_i}(s) = \exp(-\tau \cdot s)$$

where $Y_o$ is output of aircraft states from measurement, and $Y_i$ is the output without dead-time. The above formulation converted into the time domain will be $$y_o(t) = y_i(t) - \tau \frac{d y_i(t)}{dt}$$

The accuracy of this approximation depends on the transport time delay being sufficiently small relative to the rate of change of the slope of $y_i(t)$. In fact, the aircraft dead-time delay is approximate 100 mini-seconds, which is considered to be relatively small enough.

In order to simplify a series expansion of Laplace transfer function, the dead-time (or transport time delay) approximation can be simply obtained by taking the first two terms as below $$e^{-\tau s} = \frac{e^{-\frac{\tau s}{2}}}{e^{\frac{\tau s}{2}}} \approx \frac{1 - \frac{\tau s}{2} + \frac{\tau^2 s^2}{8} - \ldots}{1 + \frac{\tau s}{2} + \frac{\tau^2 s^2}{8} + \ldots} \approx \frac{1 - \frac{\tau s}{2}}{1 + \frac{\tau s}{2}}$$

Note that the formulation of $$e^{-\tau s} = \frac{1 - \frac{\tau s}{2}}{1 + \frac{\tau s}{2}} \quad (a)$$

is known as the transport time delay used in the most application software. The above formulation has shown that the transport time delay generates a very small positive real eigenvalue on the right hand side of complex plane, which will make the system unstable if not trying to eliminate its effect. Converting the above formulation into the discrete domain, the transport time delay formulae will change to:

$$e^{-\tau s} = \frac{e^{-\frac{\tau s}{2}}}{e^{\frac{\tau s}{2}}} \approx \frac{\left(1 - \frac{\tau s}{2k}\right)^k}{\left(1 + \frac{\tau s}{2k}\right)^k} = \left(\frac{1 - \frac{\tau s}{2k}}{1 + \frac{\tau s}{2k}}\right)^k = \left(\frac{2k - \tau s}{2k + \tau s}\right)^k \quad (b)$$

Note that the method of dynamic plant feedback technology including time delay is based on the formulations of (a) and (b) to cancel out the dead-time effect inside the feedback control system. Effects of plant transport delay in three loop flight control laws design can be reduced to be minimized using two methods. The first method is to introduce the transport delay into individual control loop, when multiple sensor transport delays are detected through the flight test. The second method is to assume the transport delay on individual control loop is with the same transport time delay. Therefore, one major sensor transport delays on each axis of control laws are fed-back with its associate reduced order plant transfer function. These two methods are described below.

Dynamic Plant Selection from Reduced Order

Linear aircraft usually can be represented as a form of matrices as below:

$$\dot{x} = Ax + Bu$$

$$y = Cx$$

where x is the state variables, A is the state matrix, B is the control matrix, C is the measurement output matrix, and y is the measurement output. All transfer functions for flight mechanics are hidden in this form of multi-input multi-output matrices called MIMO. Calculation of transfer functions of these matrices must go through several procedures to result in a correct set. Otherwise, the calculation of the individual reduced-order flight mechanics must through its original aerodynamics parameters. Aerodynamics parameters are changed with respect to airspeed in wind-tunnel format. Sometimes, the slope of aerodynamics parameters can be sign-reversed. When consider all these together, it is shown that the entire aerodynamics models with various C.G. and airspeed changes are with many uncertainties hidden inside these models. To determine an ideal reduced-order model for individual control axis, the desired method can be changed from one airspeed to other speed, and from the forward C.G case to the Aft C.G. case.

Since flight mechanics of aircraft have been known to be longitudinal motion and lateral motion. On the longitudinal control, for high speed, there are two motions. One is short period, which is higher frequency stable model, and the other is Phugoid mode, which is within low frequency region in complex plane, either stable or unstable. In longitudinal low speed region, the short period mode may split into two real modes which are heave mode and pitching mode. On the lateral control, no matter high speed or low speed, there are three motions. The first one is the rolling mode, which is higher frequency stable mode. The second one is Dutch roll mode, which is within low frequency region in complex plane, either stable or unstable. The third mode is the spiral mode which is real and close to the origin in the complex plane, either stable or unstable.

The design goals of the desired method of dynamic plant selection for reduced-order models for feedback control are to achieve the following: (1) simplify the entire process of finding reduced-order transfer functions; (2) avoid speed gain schedule for various linear plants; and (3) simplify common feedback to be suitable for dead-time cancellation.

Figure 8:
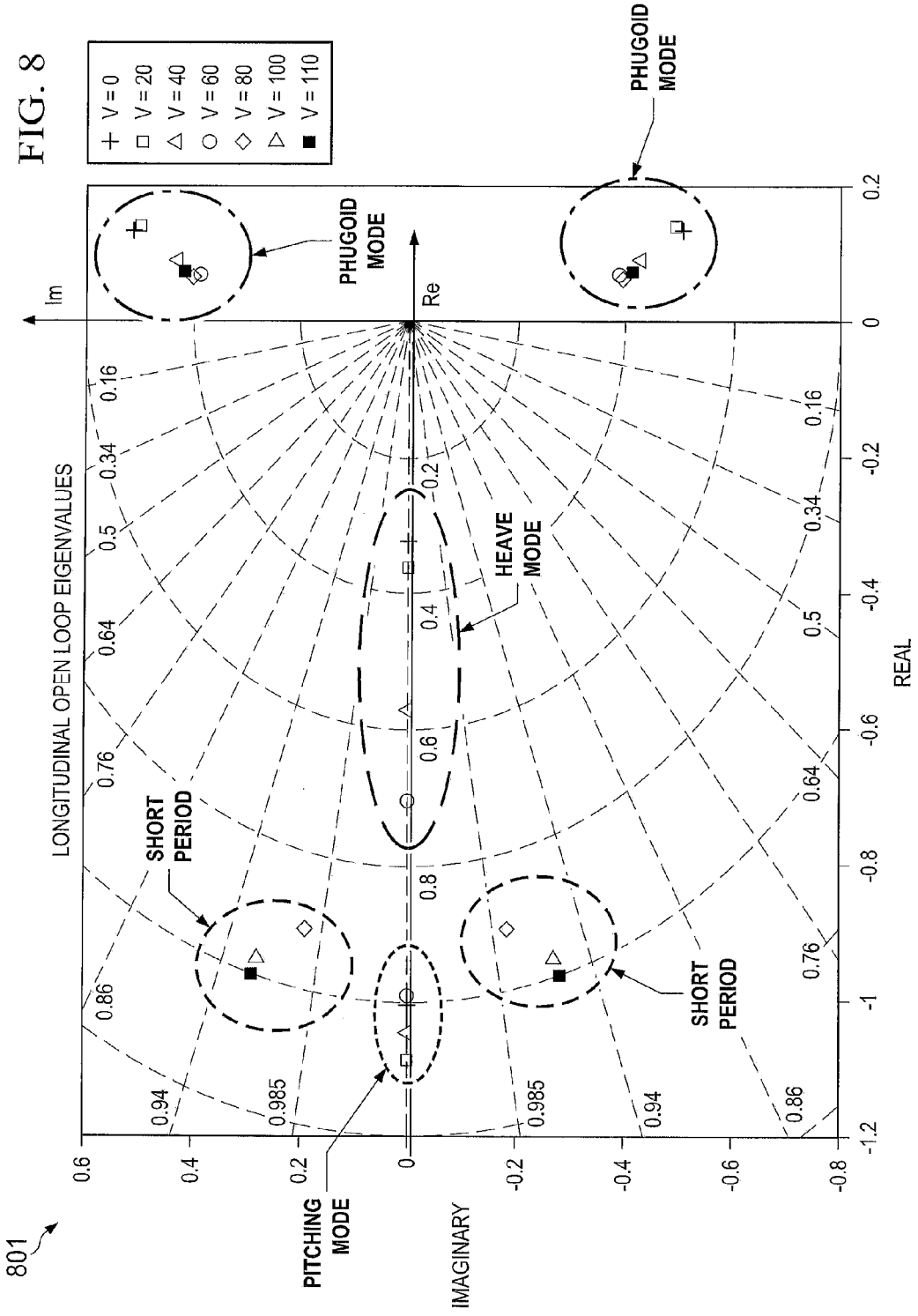
FIG. 8 shows the eigenvalue location of longitudinal motions.

A commercial helicopter is used as an example to help achieve the above goals for the reduced order transfer functions using the eigenvalue plots of linear matrices with various airspeeds. Eigenvalue sets of this aircraft are illustrated in plots 801 and 901 of respective FIGS. 8 and 9 as examples for model reduction calculations. Note that all eigenvalues of linear models for all speeds are displayed. FIG. 8 depicts the plot of the longitudinal motions from hover to high speed of 110 knots with each 20 knots increment. Note that eigenvalue relationship of the longitudinal flight mechanics modes are also marked in FIG. 8. Note that the Phugoid mode is a complex conjugate pair, which is unstable, as shown in the right hand side of FIG. 8.

From FIG. 8, the eigenvalues of the Phugoid mode can be found with form of the following equation:

$$\lambda_{ph}{}^i = a_i \pm b_i j$$

where $\lambda$ defines as an eigenvalue symbol, subscript of ph is for Phugoid mode, "a" is the real portion of $\lambda$, and "b" is complex portion of $\lambda$, and "i". Note that "i" is defined as the total airspeed cases in FIG. 8 for airspeed of (0, 20, 40, . . . , 110 knots.)

From individual airspeed Phugoid function, the frequency can be defined as $$\omega_{ph}{}^i = \sqrt{a_i{}^2 + b_i{}^2}$$

and the damping ratio will be $$\zeta_{ph}^i = \frac{a_i}{\sqrt{a_i^2 + b_i^2}} = \frac{a_i}{\omega_{ph}^i}$$

The normalized value of the various Phugoid transfer function can then be defined as:

$$\omega_{ph} = \frac{\sum_{i=1}^{7}\sqrt{a_i^2 + b_i^2}}{7}$$

$$\zeta_{ph} = \frac{1}{7}\sum_{i=1}^{7}\left(\frac{a_i}{\sqrt{a_i^2 + b_i^2}}\right)$$

Therefore, the normalized transfer function of Phugoid mode can be converted to $$TF(PH) = \frac{\omega_{ph}^2}{s^2 + 2\zeta_{ph}\omega_{ph} + \omega_{ph}^2}$$

Similarly, the short period eigenvalues shown in left hand side of FIG. 8 with various airspeeds can be defined as $$\lambda_{SP} = c_i \pm d_i j$$

The mean short period transfer function will be $$TF(SP) = \frac{\omega_{SP}^2}{s^2 + 2\zeta_{SP}\omega_{SP} + \omega_{SP}^2}$$

where $$\omega_{SP} = \frac{\sum_{i=1}^{7}\sqrt{c_i^2 + d_i^2}}{7}$$

$$\zeta_{SP} = \frac{1}{7}\sum_{i=1}^{7}\left(\frac{c_i}{\sqrt{c_i^2 + d_i^2}}\right)$$

For the pure real eigenvalue pair, the damping ratio will be 1.0. In this situation, the short period mode will split into heave mode and pitching mode.

Figure 9:
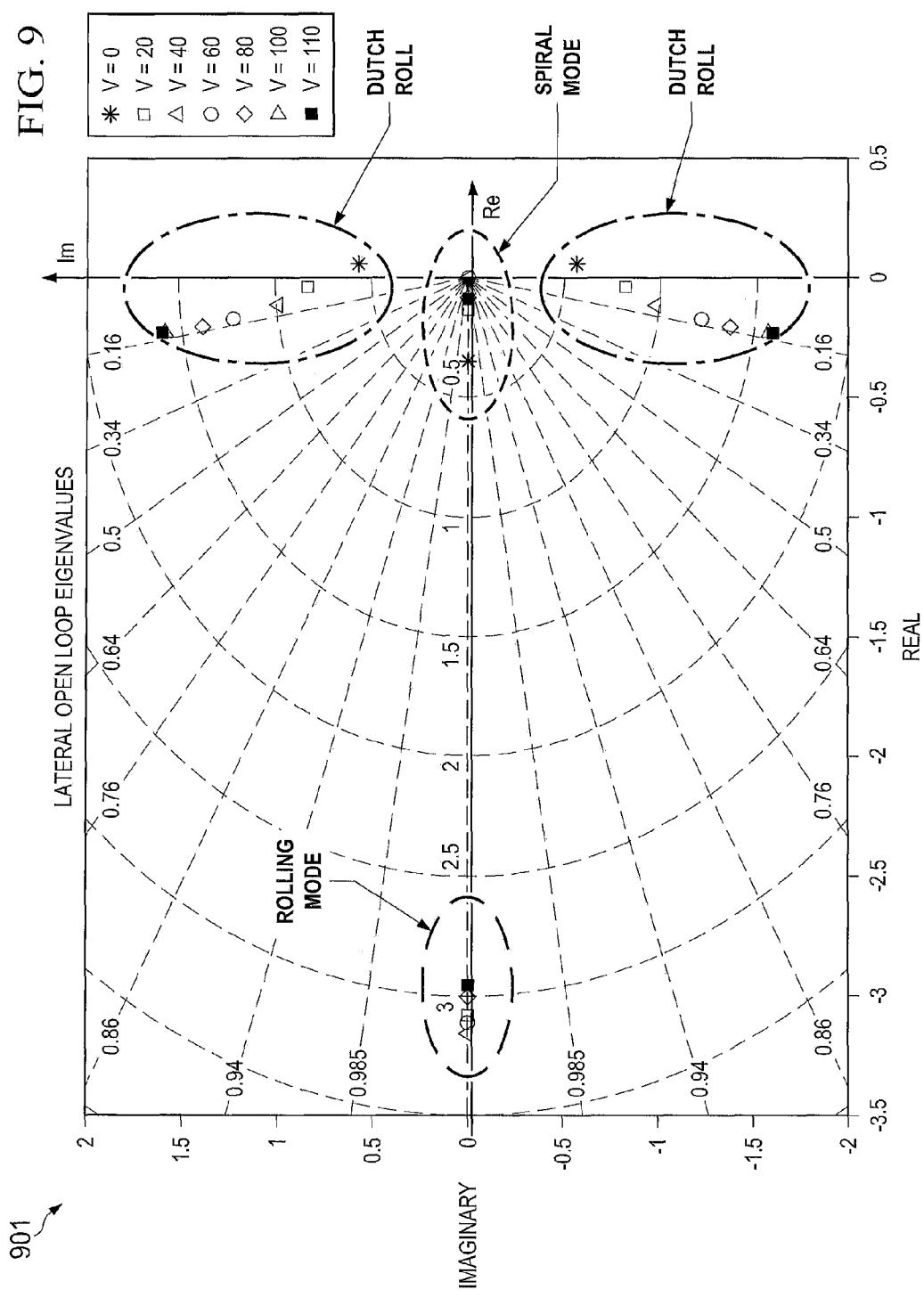
FIG. 9 shows the eigenvalue location of lateral motions.

FIG. 9 is a plot 901 of the lateral motions from hover to high speed of 110 knots with each 20 knots increment. Note that eigenvalue relationship of the lateral flight mechanics modes are also marked in FIG. 9. Following the longitudinal eigenvalue definitions, the Dutch roll eigenvalues will be $$\lambda_{DR} = e_i \pm f_i j$$

Following the process from longitudinal Phugoid development, the normalized transfer function of Dutch roll will then become $$TF(DR) = \frac{\omega_{DR}^2}{s^2 + 2\zeta_{DR}\omega_{DR} + \omega_{DR}^2}$$

$$\omega_{DR} = \frac{\sum_{i=1}^{7}\sqrt{e_i^2 + f_i^2}}{7}$$

$$\zeta_{DR} = \frac{1}{7}\sum_{i=1}^{7}\left(\frac{c_i}{\sqrt{e_i^2 + f_i^2}}\right)$$

The eigenvalue of spiral mode (Sm) is $$\lambda_{Sm} = -k_i^{Sm}$$

Note that spiral eigenvalue is small real and very close to the origin. Its transfer function can be $$TF(Sm) = \frac{k^{Sm}}{s + k^{Sm}}$$

where $$k^{Sm} = \frac{1}{7}\sum_{i=1}^{7}(k_i^{Sm})$$

The eigenvalue of the rolling mode (Rm) will be $$\lambda_{Rm} = -k_i^{Rm}$$

Note that rolling mode eigenvalue is very stable. Its transfer function will be $$TF(Rm) = \frac{k^{Rm}}{s + k^{Rm}}$$

where $$k^{Rm} = \frac{1}{7}\sum_{i=1}^{7}(k_i^{Rm})$$

Note that the above normalized method is very standard. Since uncertainties of the plant have been considered and resolved in the first inner loop robust control design, the focuses of all transfer functions will be used for dynamic plant feedback for canceling the effect from calculation time (dead-time) delay. In addition, the above transfer functions can be summarized in Table 3.2.1.

The method of how to implement these transfer functions into the dynamic plant feedback control technology including time delay will be described in the next sub-section.

TABLE 3.2.1

Transfer functions of flight mechanics for individual flight control loop

| Modes | Transfer Functions | Usage | Comments |
|---|---|---|---|
| Phugoid mode | $TF(PH) = \dfrac{\omega_{ph}^2}{s^2 + 2\xi_{ph}\omega_{ph} + \omega_{ph}^2}$ | Pitch attitude command | (pitch attitude, speed) control |
| Short Period Mode | $TF(SP) = \dfrac{\omega_{SP}^2}{s^2 + 2\xi_{SP}\omega_{SP} + \omega_{SP}^2}$ | Pitch rate command Collective Vz command | (pitch rate, heave) control |
| Dutch Roll Mode | $TF(DR) = \dfrac{\omega_{DR}^2}{s^2 + 2\xi_{DR}\omega_{DR} + \omega_{DR}^2}$ | Roll attitude command | (Roll attitude, sideward velocity) control |
| Spiral Mode | $TF(Sm) = \dfrac{k^{Sm}}{s + k^{Sm}}$ | Yaw rate command | Yaw rate control for low speed |
| Rolling mode | $TF(Rm) = \dfrac{k^{Rm}}{s + k^{Rm}}$ | Roll rate command | Roll rate control |

Method of Time Delay on Individual Sensor Loop

Design of dynamic plant feedback technology with transport time delay depends on various sensor feeding rates from various devices. There are more than five different sensor packages which can be employed to enhance pilot's flight controls. However, device types of the sensors can be electrical or mechanical. For electrical type of the sensors, its feedback rate is much faster than that of the mechanical type.

TABLE 3.2.2

Various sensor filter designs with respect to dynamic reduced-order plant feedback

| Device | Sensor Purpose | Sensor Filter | Comments |
|---|---|---|---|
| Radar Altimeter | Ground Altitude → RA Hold | Two to three Hertz | Fast altitude hold |
| Inertia Reference System (IRS) | (p, q, r, → Rate command θ, φ, ψ→ Attitude command $A_x, A_y, A_z$→ Acceleration command | Two to three Hertz | Fast command mode Fast heading hold |
| Enhance GPS IRS (EGI) | IRS + Vx, Vy, Vz Ground Speed Hold | Two to three Hertz | Fast command mode Fast speed hold |
| Attitude Heading Reference System (AHRS) | θ, φ → Attitude command ψ→ Heading hold function | | Fast attitude command mode |
| ADAHRS | Air data computer + AHRS θ, φ → Attitude command ψ→ Heading hold function Vx → Speed hold Alt → Altitude Hold | Attitude: Two to three Hertz Altitude/ Airspeed: Less than one Hertz | Enhanced air data airspeed and altitude functions from AHRS |

TABLE 3.2.2-continued

Various sensor filter designs with respect to dynamic reduced-order plant feedback

| Device | Sensor Purpose | Sensor Filter | Comments |
|---|---|---|---|
| Pitot Statics air data computer system | High speed $V_x$, Baro Alt, outside temperature | Less than one Hertz | Slow airspeed hold Slow altitude hold |
| AOA Tubes | High speed α (Angle of Attack and β (Sideslip Angle), | Less than one Hertz | Slow vertical speed hold Slow sideslip angle hold |

Therefore, design of the flight control laws must be incorporated with the correct sensor feedback rate. Types of the sensor devices are tabulated in Table 3.2.2. Note that the sensor filter design is based on device's transmit rate and control functionality. Design of control laws based on various sensor rates will make the entire design to be more consolidated. Therefore, to cancel out the effect of the transport time delay in CLAWS, the dynamic feedback plant with individual transport time delay must be designed into individual control law loops.

Figure 10:
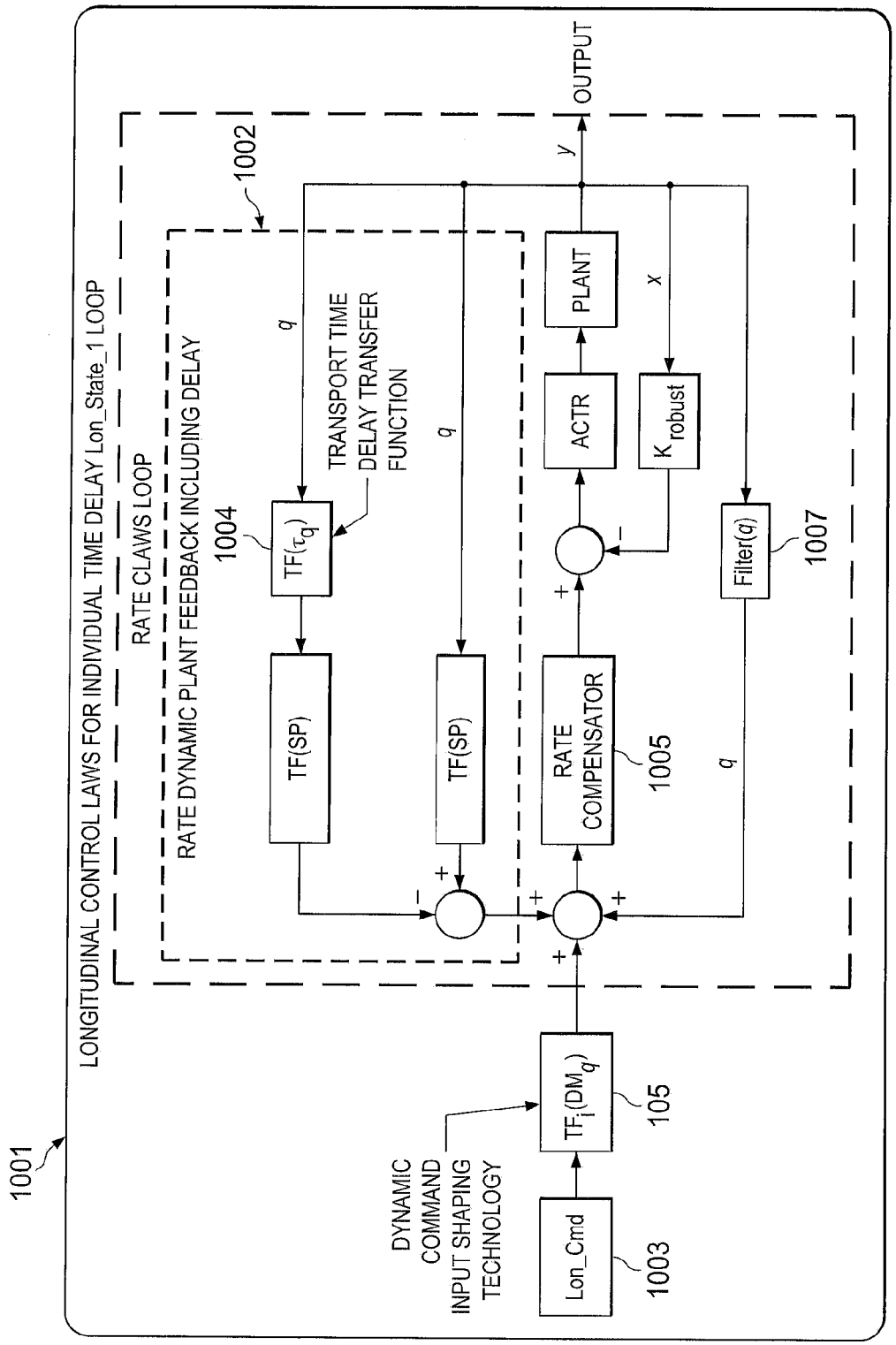
FIG. 10 shows the longitudinal rate control laws (rate command/zero rate hold, or rate command/attitude hold mode)

In longitudinal control loop 1001, as shown in FIG. 10, the pitch rate mode is the fastest eigenvalue when it split to two real eigenvalues from short period mode at low speed. Therefore, the pitch rate command mode is designed as the first longitudinal command loop 1003 in longitudinal control laws design after the robust 1$^{st}$ inner loop design. FIG. 10 shows pitch rate command control laws with pitch rate dynamic plant feedback control 1002 including transport time delay transfer function 1004. In FIG. 10, it is shown that the dynamic reduced-order plant used to eliminate the pitch rate transport time delay is the short period mode transfer function. The pitch rate compensator 1005 has been proven that it can be any combination of lead-lag filters 1007. Therefore, the integrator design or (PID) type of classic control laws design can be avoided to avoid integrator winding-up. Note that the dynamic command input shaping technology for pitch rate command will be discussed below.

Integration of pitch rate command CLAWS design has also been proven to be capable of generating rate command zero rate hold mode. Since the plant after three loop control laws feedback, the aircraft is very stable even with the transport time delay. Therefore, this pitch rate command zero rate mode can make aircraft fly similar to rate command attitude mode.

For pitch rate command attitude hold mode, a small integrator must be used to implement the attitude hold function. However, the gain of this attitude can be tuned to be small enough such that it will be very easily washed out when the stick command return to the detent position or the force trim release button is pressed.

After completing the pitch rate command mode design, the following pitching control methods can be implemented: (1) Attitude Command Attitude Hold mode, or (2) Attitude Command forward Velocity Hold mode, or (3) Acceleration Command Attitude Hold mode, or (4) Acceleration Command forward Velocity Hold mode.

Attitude command attitude hold CLAWS will be used to demonstrate the design of dynamic feedback reduced-order plant for attitude transport time delay. Attitude command control of this mode is illustrated in loop 1101 of FIG. 11. The attitude command control is integrated with rate control laws loop 1103 as shown in the right hand side of FIG. 11. The reasons of integrating both loops together are (1) to avoid complicating the logic design by switching one loop to the other loop; or (2) to take advantage of the rate loop feedback plant for canceling the rate transport delay effect in the feedback system.

Note that the rate CLAWS loop inside the attitude command mode design is without any integrator inside its design. Therefore, the design of integrator washout and/or hold conditions can be avoided.

Figure 11:
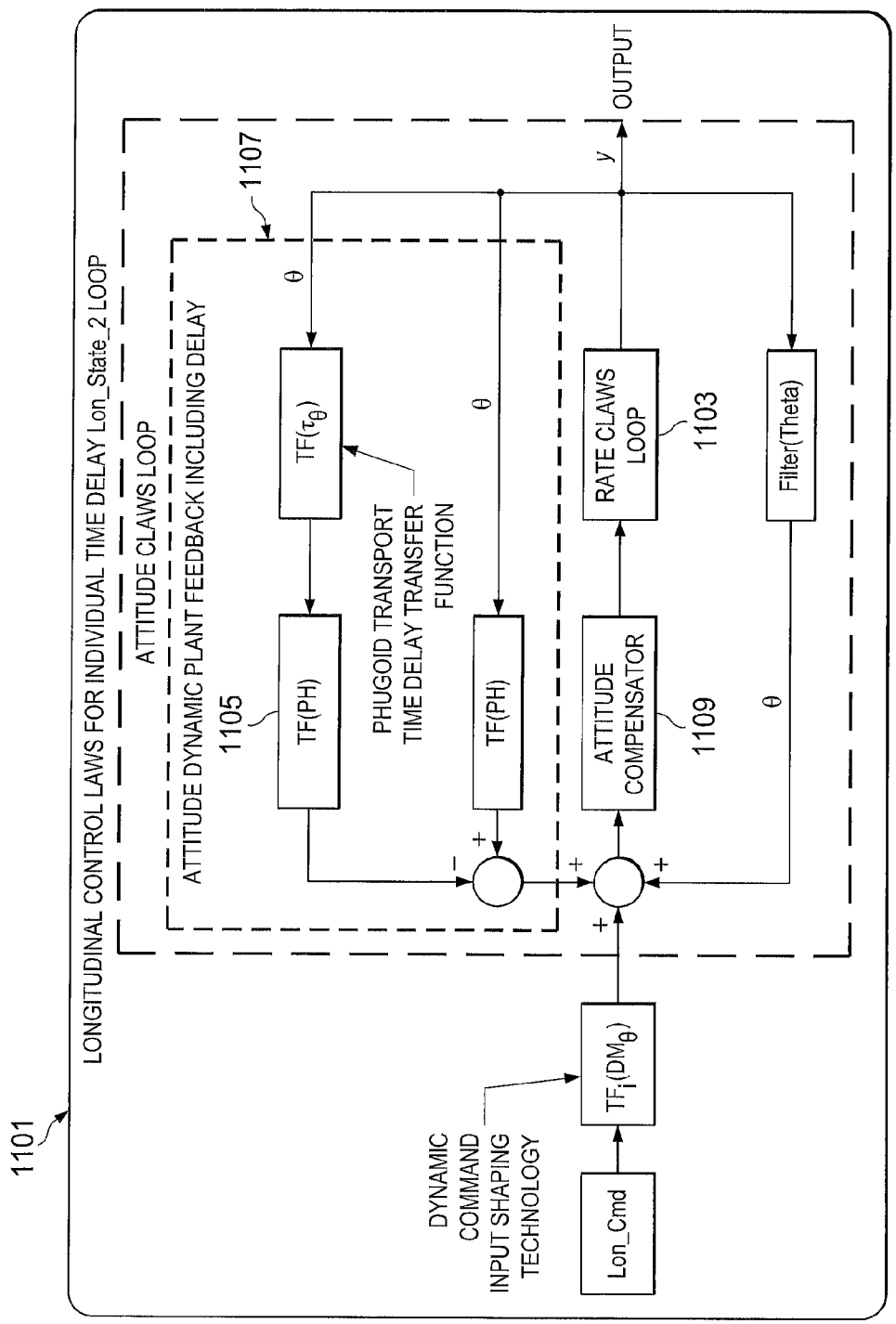
FIG. 11 shows the longitudinal attitude control laws (attitude command/attitude hold)

Attitude dynamic feedback reduced-order plant 1105 in the top right hand side of FIG. 11 is the Phugoid transfer function. The transport time delay is the pitch attitude calculation time delay from the flight test. The transfer function of this transport time delay 1107 is also shown on the top right hand side of FIG. 11. The reason of using Phugoid mode transfer function in this design is because the pitch angle (theta) is one the natural state variables in the Phugoid mode.

The attitude mode compensator design 1109 of in FIG. 11 contains two types. The first method of the attitude compensator design is without any integrator design inside this compensator, which means only the lead-lag filters will be used to accomplish the attitude command design. However, this type of command is used for pure attitude command mode. For the attitude hold mode, the pilot must set the stick command to its associated travel position and hold it there. For the autopilot mode, the autopilot command will not transfer through an integrator. Therefore, the correct attitude command is commanded.

The second method of attitude command compensator is called attitude command attitude hold (ACAH). The compensator of ACAH method contains at least one integrator inside either attitude loop or rate loop to hold the desired attitude when the pilot command is set or force trim release button is pressed. Design of this type of compensator must collaborate with the pilot stick functions such as longitudinal/lateral beep and force trim release function. Note that since at least one integrator is used in this method, the trim follow-up method can be implemented. Therefore, this method is perfect for the stick back-driven design.

Figure 12:
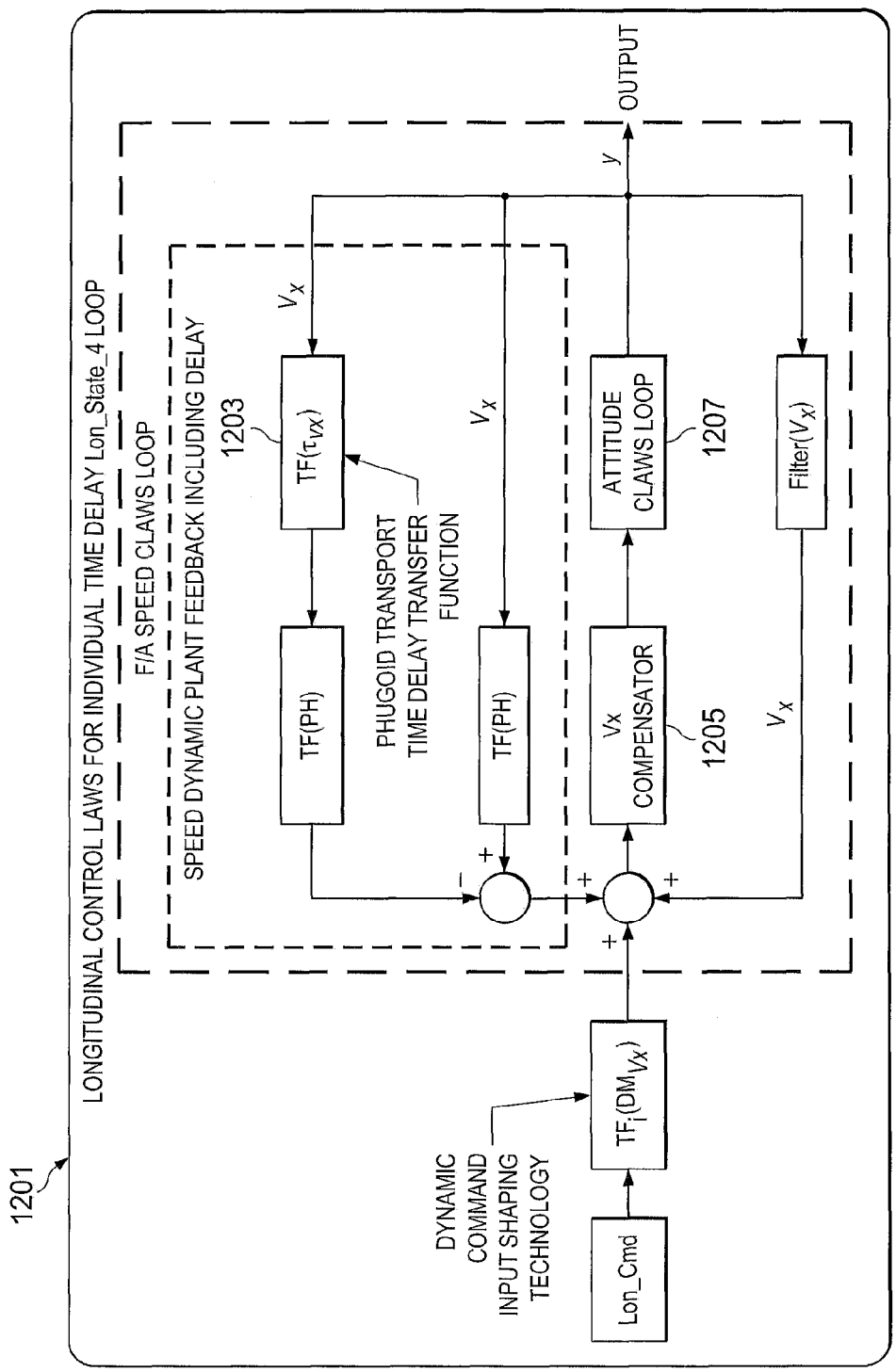
FIG. 12 shows the longitudinal speed control laws (TRC or attitude command speed hold, or acceleration command speed hold, or speed beep)

After longitudinal attitude command mode integration, the longitudinal speed control can be integrated. Design of the longitudinal speed loop 1201 is shown in FIG. 12. In this figure, the attitude control laws design is included in the right hand side of this figure. This arrangement is to avoid complicating the logic design by switching one loop to the other loop and to take advantage of the rate and attitude loop feedback plants for canceling the rate and attitude transport delay effect in the feedback system. Note that speed compensator design must have at least one integrator for speed hold function. For high speed mode, this loop is the outer loop of longitudinal control laws.

When the speed sensor is available from either EGI for ground speed sensor or ADC for airspeed, the design of longitudinal flight control laws can be either attitude command speed hold, or acceleration command speed hold. Acceleration command can be implemented either on attitude loop or the position before speed hold mode being engaged.

The speed dynamic feedback reduced-order plant in the top right hand side of FIG. 12 is the Phugoid transfer function for speed hold loop. The transport time delay is the speed calculation time delay from the flight test. The transfer function of this transport time delay 1203 is also shown on the top right hand side of FIG. 12. The reason of using Phugoid mode transfer function in this design is because the airspeed ($V_x$) is one the nature state variables in the Phugoid mode. The dynamic model transfer function used in this loop is for speed beep functions or TRC mode close to hover region, or speed navigation mode. In communication with the Vx Compensator 1205 is the attitude control law loop 1207.

The longitudinal speed compensator design in FIG. 12 is with at least one integrator with lead-lag filters inside. The washout logic with the integrator is controlled by the maneuver mode either by the pilot command out of detent signals or autopilot input.

Longitudinal control laws from rate command, to attitude command and then to the speed hold mode have contained at least three types of sensor transport time delays. This kind of arrangement matches the transport time delay formulation (b). It has been demonstrated in flight test that this method is as robust as the dynamic reduced-order plant feedback method to be described in the next session for total time delay.

Method of Total Transport Time Delay on the Main CLAWS Axis

Figure 13:
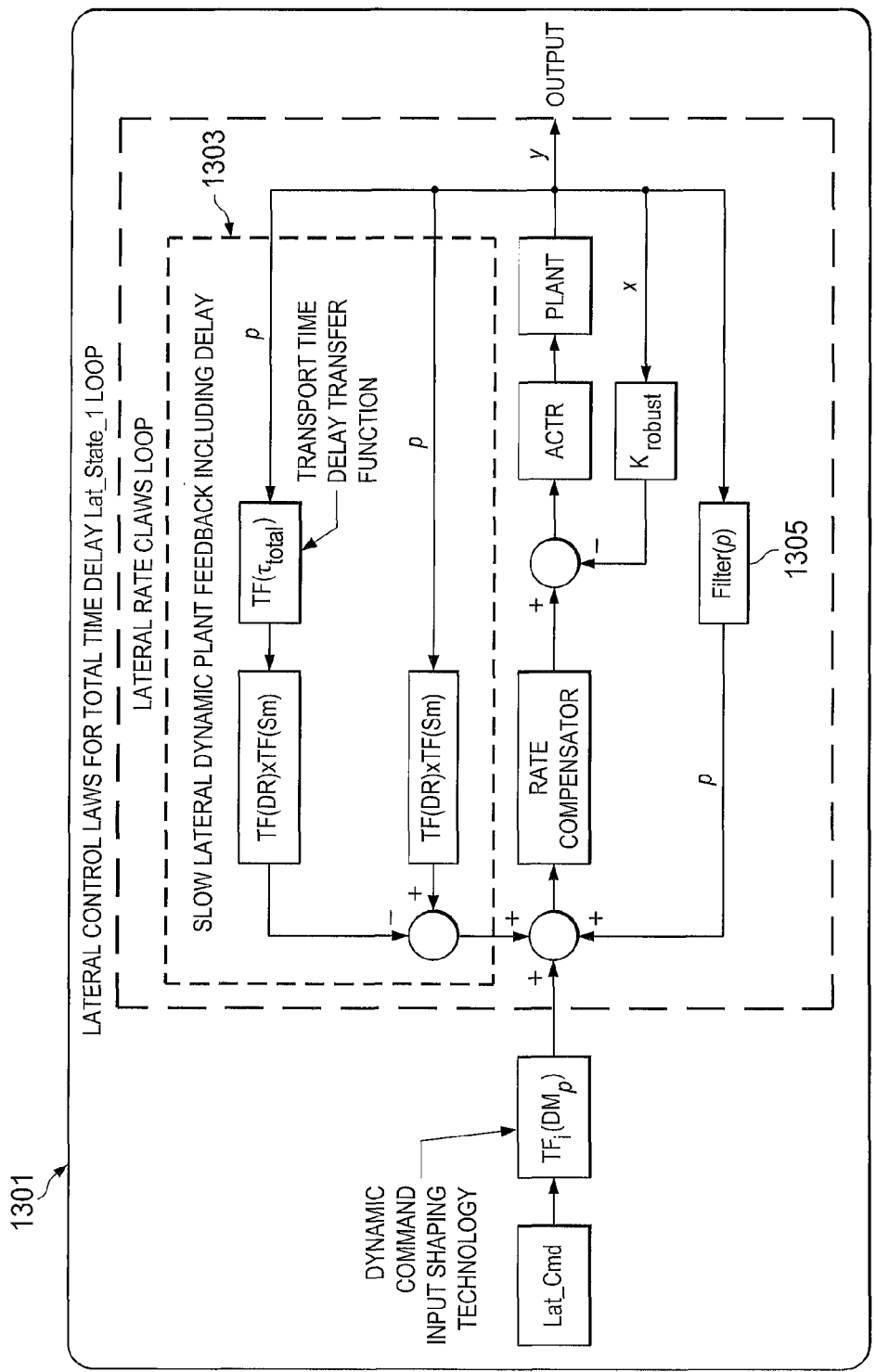
FIG. 13 shows the lateral rate control laws (rate command/zero rate hold, or rate command/attitude hold mode)

The method of dynamic reduced-order plant feedback method including total transport time delay transfer function is presented in this section. Lateral flight control laws are used to illustrate the methodology using lateral rate command mode design 1301 as shown in FIG. 13. Note that lateral control laws contain more than three command modes such as rate command, attitude command and acceleration command mode. No matter which command mode is used, the dynamic reduced-order plant transfer function and transport time delay transfer function are inserted in the fastest inner loop before entering the actuator transfer function.

The total transport time delay transfer function 1303 is presented in the top right hand side of FIG. 13. This total transport time is calculated based on flight test data using command frequency responses. Note that the total time delay added up from rate and attitude mode (maneuver command mode) will be sufficient to accomplish the entire design. Since airspeed is a hold mode, its time delay value is not necessarily included in the total time delay design for command mode. Since the total time delay will remain small after adding up from command side, the negative effect of its transfer function to flight control laws will be on the slow flight mechanics mode. Therefore, in the lateral motion, the Dutch roll and spiral modes shall be affected the most. This is why the Dutch roll transfer function and spiral mode transfer function are shown in the spot of dynamic feedback reduced-order transfer functions in FIG. 13. The rate compensator design in FIG. 13 for lateral control laws can be two phases similar to longitudinal control laws. The first phase is to use the combination of lead-lag filters 1305. This method is designed for rate command zero rate hold. The advantage of this method is that there is not any integrator inside this loop design. Therefore, this loop can be used for the final degrade mode. This kind of design can also be used for transit from ground mode to in-flight mode.

Since the entire time delay has been added up in this method, all other loop control laws will not need to include any transport time design concept. The major disadvantage of this method is that the correct compensator design will be harder to find compared that of the individual feedback plant technology for individual sensor loop. However, the benefits of this method are (1) The final degrade will be much more robust since the total time delay is considered; (2) Outer loop design will be simpler than that of the individual sensor plant feedback design; and (3) This method is ca be easily embedded into the classic control laws without robust $1^{st}$ inner loop.

In summary, the dynamic plant feedback technology including the transport time delay can be used to reduce the negative effect from the flight control computer calculation time delay for both methods discussed herein. With consideration of the plant uncertainties being re-solved in the robust 1$^{st}$ inner loop design, the normalized reduced-order transfer function indeed simplifies the entire control laws gain scheduling issue for model accuracy. Instead of using the inverse plant to help the aircraft stability, the new invented three loop control laws separate these tasks different. For example: (a) Robust 1$^{st}$ inner loop takes care of stability issues and system uncertainties; and (b) Dynamic reduced order plant including time delay removes the negative effect in the control system such that the entire control laws is easily stabilized. Now, the task moves to make the pilot command quickness satisfy the special flight conditions.

Dynamic Command Input Shaping Technology

Figure 14:
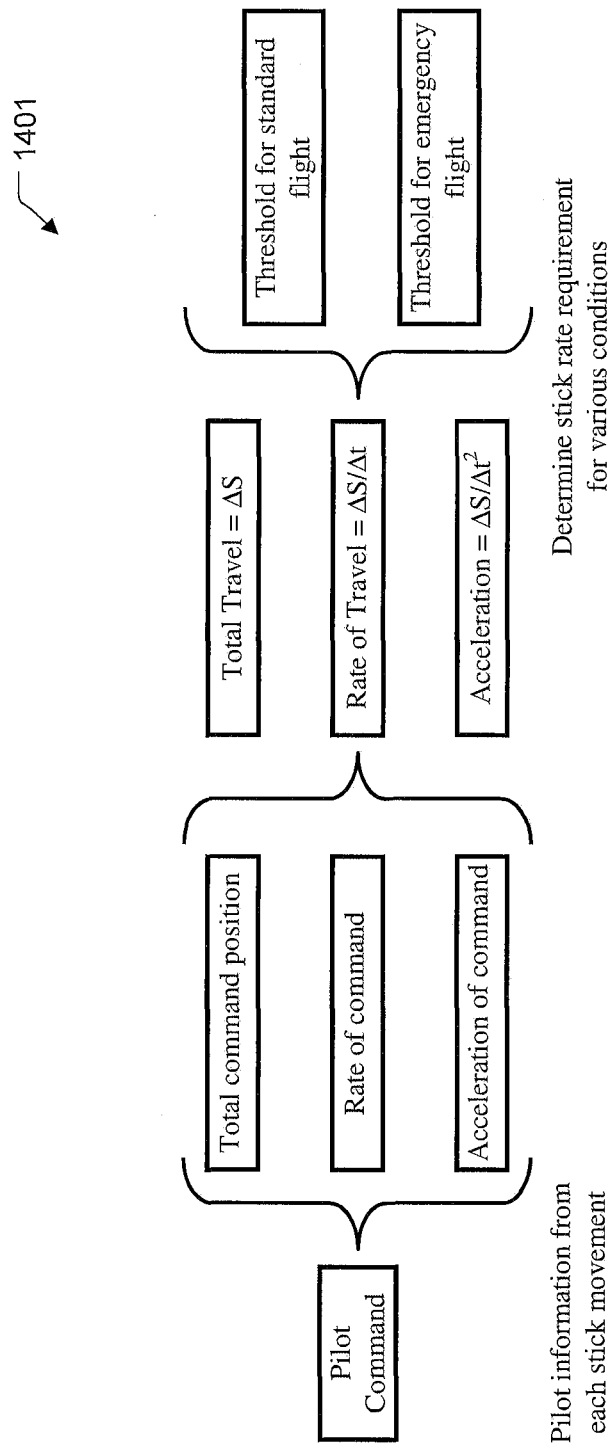
FIG. 14 shows the dynamic command input shaping analysis chart.

Most control law design based on the standard model following technology usually used the command position to determine the model following transfer function. However, the pilot command can be generated based on the various flight conditions. For example, when the pilot meets some emergency condition such as collision avoidance, bird avoidance, dual engine failure, and so on, the pilot's command can be very fast and large. Under these pilot's commands and conditions, the standard model following may become a barrier to flight control laws design. Therefore, to improve the quickness of the model following technology, the dynamic command input shaping technology is invented. This method is described below and shown in diagram 1401 of FIG. 14 and plot 1501 of FIG. 15.

The pilot command generated for flight control can be separated into three portions. The first one is for the standard flight control. The second one is for autopilot, flight director and navigation mode. The third one is for the emergency flight conditions.

Note that from each stick movement, the quickness of the stick can be determined by the stick rate and acceleration from one stick movement to the other stick movement. For example, when initial stick position is in-detent, the stick suddenly moves very quick and large. In this case, the quickness of the stick rate will be used to determine which the dynamic models will be switched to. The other example is that during the normal pilot hand-on maneuver, the pilot is with very slow stick and position movement, suddenly stick position, and rate changes with very quick acceleration response. In this case, one can assume that the pilot is trying to avoid something. The standard model following method shall not block the pilot and slow down the response in this important one second period, but not with current standard model following design. All the above descriptions are the concept for the dynamic command input shaping technology. In the way, the dynamic command models will be suitable for any types of the pilot command.

However, the quickness design of the dynamic control input shaping technology will depend on the dynamic model transfer functions of (1) Amplitude; (2) Frequency; and (3) Damping ratio.

A typical lateral dynamic model transfer function is shown in the following:

$$TF(MD) = A_{lat} \frac{\omega_n^2}{(s^2 + 2\zeta\omega_n + \omega_n^2)}$$

where $A_{lat}$ in the above formulation is the amplitude of command converted from inch to deg or deg/sec of lateral angle or rate, the parameter, $\omega_n$, is the dynamic model transfer function frequency and $\zeta$ is the damping ratio. Note that each inch of control input from lateral to longitudinal axis is different. Similarly, control input shaping amplitude gains on rate command, attitude command or acceleration command for all four axes including pedal and collective or thrust axis are also different. The desired amplitude of the dynamic model for dynamic model input shaping technology must be defined based on aircraft type with gross weight and capability.

Figure 15:
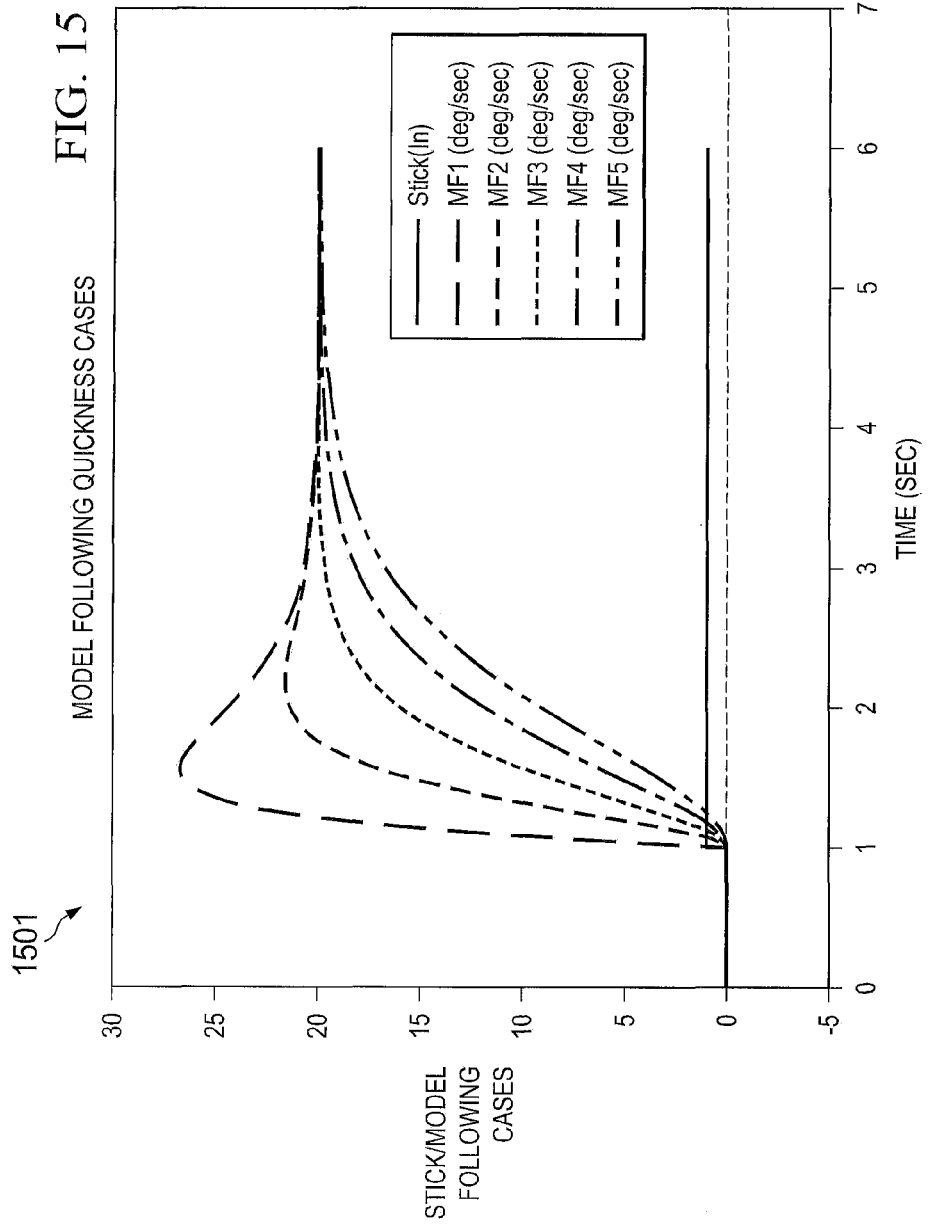
FIG. 15 shows the dynamic models based on various stick rates.

The example of a light weight/utility commercial helicopter on lateral axis is employed to help describe the dynamic control input shaping technology. As shown in FIG. 15, a lateral rate command dynamic model shaping method is applied to a light utility commercial helicopter. Note that the dynamic model transfer functions of (MD3 and MD4) in FIG. 15 are designed similar to the standard model following flight control laws. The MD3 and MD4 dynamic model transfer functions are with the following coefficients:

$A_{lat}$=20.0, $\zeta$=1, and $\omega_n$=3 and 4

Therefore, each inch of the stick will provide 20 deg/sec roll rate in steady state value. Note that the reason of selecting the natural frequency between (3 and 4) is based on the helicopter rolling mode requirement. The rising time and quickness is adjusted by the lead-lag transfer function. Dynamic mode method 1 (MD1) in FIG. 15 is adjusted by a lead-gain factor of 2.0 and dynamic model 2 (MD2) is adjusted by a lead gain factor of 1.5. Of course, more dynamic model transfer functions can be included to fit for dynamic command input shaping arrangement.

The entire dynamic control input shaping technology also reserves the function for the final degrade mode. When the aircraft is in the final degrade mode such as dual actuator failure, dual INS failure for FBW aircraft, the quickness of aircraft maneuver may reduce to increase higher gain margin, phase margin, and better disturbance rejection, but also reduce the aircraft engines and actuators load. In this situation, the transfer function of dynamic model (MD5) can be used to achieve this requirement.

Finally, the dynamic command input shaping technology is summarized in Table 3.3. Although the only five model transfer function are implemented and discussed in this method, the desired dynamic control input shaping technology is not limited to these dynamic transfer function models.

TABLE 3.3

Summary of MF based on command input quickness from FIG. 15.

| Dynamic Models | Emergency Avoidance Maneuver | Quick Maneuver | Standard Maneuver | Sensor/actuator final degrade condition |
|---|---|---|---|---|
| Transfer Functions | TF(MD1) | TF(MD2) | TF(MD3) and TF(MD4) | TF(MD5) |

In addition, the individual dynamic control input shaping quickness must be incorporated with its control loop design. For examples, on the longitudinal and lateral maneuvers, the maneuvers of pitch/roll rates are much quicker than that of pitch/roll attitudes. Therefore, the pitch/roll dynamic model transfer function frequencies for attitude command designs are slower than that of the rate command. Details of these will not be addressed in this patent application, since they have been considered as a standard application. Therefore, extension of this method can be extended for all axial control laws including the fixed-wing and other mobile vehicles.

Simulation and Discussion

A FBW flight control laws design on the collective axis is used to illustrate the differences between the standard model following method and this innovative flight control laws deign during duel engine failure mode in high speed and high altitude. The simulation results on dual engine failure is assumed to take place on the time=1 second. At the same time, the pilot immediately drops the collective stick for approximate four inches travels. Note that the rate of descent for each inch of collective stick travel is approximately at 9 ft/sec. The idea of this simulation is to demonstrate how fast the dynamic command input shaping technology and the standard model following method can bring the aircraft rate of descent to higher than 2200 ft/min area, which will keep the rotor RPM close to 100% for dual engine failure entrance. Note that the faster the pilot drops the stick, the quicker the rate of descent will be obtained using the dynamic command input shaping technology. In the current design, the lead time of value 2.0 is used to illustrate the entire maneuver.

Figure 16:
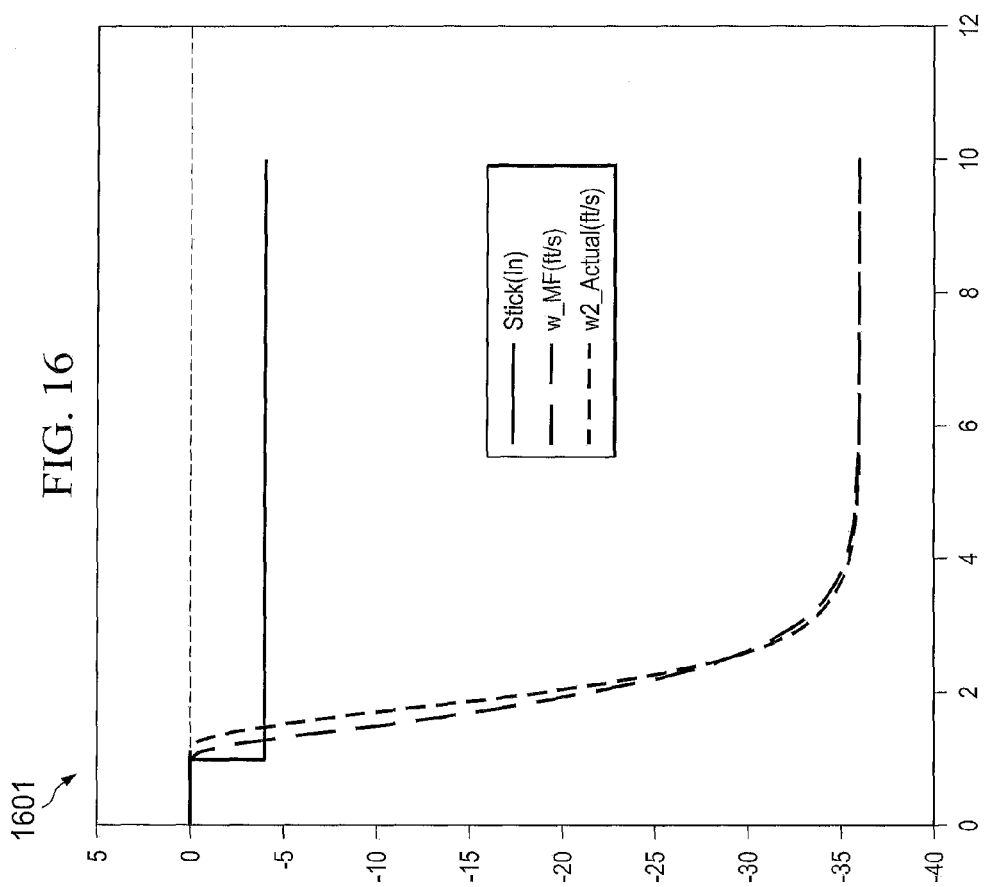
FIG. 16 shows the quickness of model following and rate of descent from the standard model following transfer function.
Figure 17:
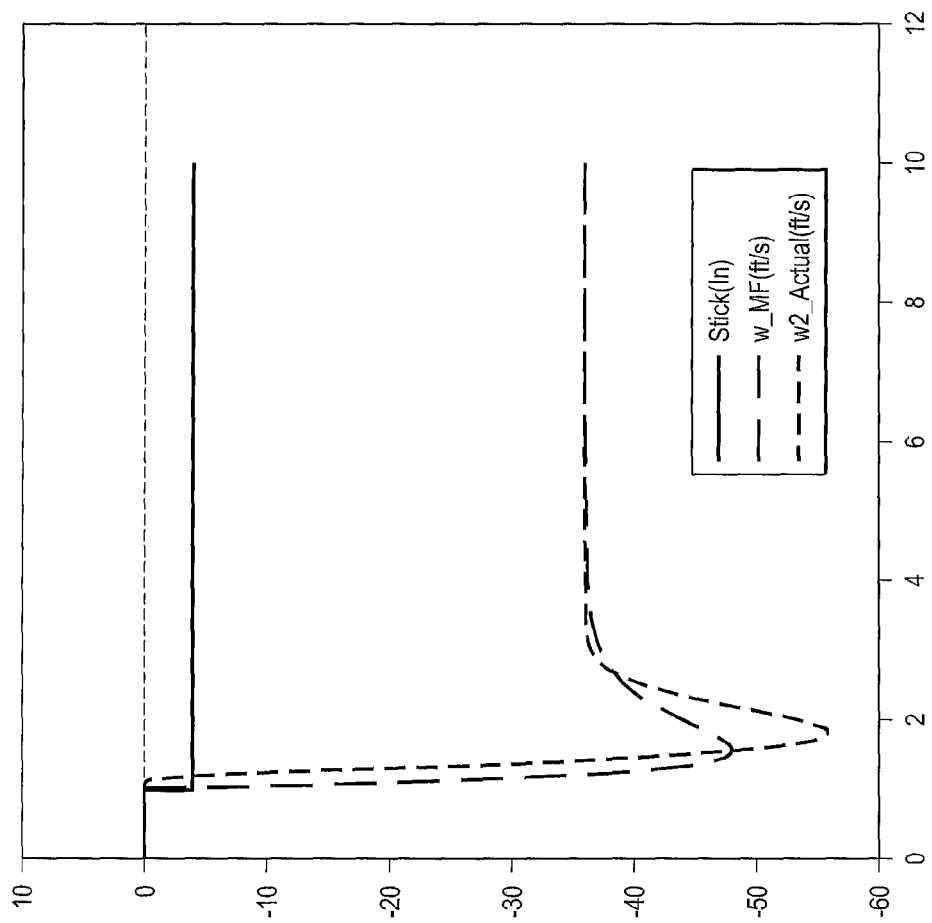
FIG. 17 shows the quickness of dynamic model transfer function response.

The results of the entire simulation based for both methods on the rate of descent are shown in graphs 1501 and 1601 of respective FIGS. 15 and 16. FIG. 15 is the standard model following collective maneuver based on the pilot command input. FIG. 16 is based on the quickness dynamic model method from dynamic command input shaping technology. During the autorotation descent, the pilot instantly places the collective stick close to the minimum stick position, which is approximate four inches of collective travel. During this command and maneuver, if the standard model following technology is used, the time of reaching the desired descending will be approximately at time equal to 4 seconds area as shown in FIG. 15. In the first second, the rate of descent will only reach approximately 20 ft/sec. Depending on the rotor design, gross weight, and delay time of recognizing dual engine failed, the rotor RPM may be already stalled. However, the innovated method of the dynamic command input shaping technology instantly makes the aircraft rate of descent to be higher than 40 ft/sec within one second. The chance of the rotor stall will be much lower. Because of the quickness of the stick input on position, rate and acceleration, the autorotation maneuver can be performed easily. Therefore, the dynamic command input shaping technology must be used in this case instead of the standard model following method.

Although particular step sequences are shown, described, and claimed, it should be understood that steps may be performed in any order, separated or combined unless otherwise indicated and will still benefit from the present disclosure.

It is apparent that a system and method with significant advantages has been described and illustrated. The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A vehicle, comprising:
    a plurality of actuators; and
    a control system operably associated with at least one actuator of the plurality of actuators, the control system having a control logic architecture having:
        a dynamic command input shaping model associated with an input command;
        a robust inner loop associated with the dynamic command input shaping model; and
        a time delay cancelation model;
    wherein the input command is received by the control system, analyzed with the control logic architecture, and thereafter commands the at least one actuator of the plurality of actuators.

2. The vehicle of claim 1, wherein the command is an autonomous command.

3. The vehicle of claim 1, wherein the vehicle is an aircraft.

4. The vehicle of claim 3, wherein the command is a pilot command.

5. The vehicle of claim 1, wherein the dynamic command input shaping model comprises a plurality of dynamic model transfer functions.

6. The vehicle of claim 5, wherein the dynamic command input shaping model is configured to switch the pilot command between a plurality of model transfer functions of the dynamic model transfer function for a rapid vehicle response.

7. The vehicle of claim 1, wherein the robust inner loop is configured to decouple a control law associated with the pilot command to individual control law flight components.

8. The vehicle of claim 7, wherein the robust inner loop is configured to compute each control law flight components with a Riccati equation.

9. The vehicle of claim 8, wherein the robust inner loop is configured to regroup the control law flight components.

10. The vehicle of claim 9, wherein a global gain set may be achievable without gain scheduling the control law.

11. The vehicle of claim 1, wherein the time delay cancelation model is configured to cancel out a plant transport delay.

12. The vehicle of claim 1, wherein the time delay cancelation model is utilized with one or more individual control loops within the robust inner loop.

13. An aircraft, comprising:
    an interface;
    a plurality of actuators; and
    a flight control computer operably associated with the interface and at least one of the plurality of the actuators, the flight control computer having a control logic architecture having:
        a dynamic command input shaping model associated with an input command;
        a robust inner loop associated with the dynamic command input shaping model; and
        a time delay cancelation model;
    wherein the input command is received by the control system, analyzed with the control logic architecture, and thereafter commands the at least one actuator of the plurality of actuators.

14. The aircraft of claim 13, wherein the aircraft is an unmanned aircraft.

15. The aircraft of claim 13, wherein the aircraft is a vertical takeoff and landing aircraft.

16. A method, comprising:
    selecting a control law based upon a flight performance of an aircraft;
    decoupling the control law into a first individual component and a second individual component of the aircraft flight motion;
    analyzing each individual component separately;
    regrouping the component of flight motion; and
    analyzing the control law with a time delay cancelation model.

17. The method of claim 16, further comprising:
    calculating each individual component with a Ricatti equation.

18. The method of claim 15, further comprising:
utilizing gain scheduling based upon the aircraft airspeed.

19. The method of claim 15, further comprising:
canceling out a plant transport delay with the time delay cancelation model.

\* \* \* \* \*